US012756623B2

(12) United States Patent
Rojas Jimenez et al.

(10) Patent No.: US 12,756,623 B2
(45) Date of Patent: Oct. 6, 2026

(54) VIRTUAL SWITCH FRAMEWORK FOR NETWORK SWITCHING

(71) Applicant: Hewlett Packard Enterprise Development LP, Spring, TX (US)

(72) Inventors: Marco Ney Rojas Jimenez, Heredia (CR); Luis Alberto Garcia Gonzalez, Heredia (CR); Alonso Jose Carvajal Rojas, Heredia (CR)

(73) Assignee: Hewlett Packard Enterprise Development LP, Spring, TX (US)

( * ) Notice: Subject to any disclaimer, the term of this patent is extended or adjusted under 35 U.S.C. 154(b) by 59 days.

(21) Appl. No.: 18/889,105

(22) Filed: Sep. 18, 2024

(65) Prior Publication Data

US 2026/0135762 A1 May 14, 2026

(51) Int. Cl.

| | |
|---|---|
| ***H04L 41/08*** | (2022.01) |
| ***H04L 41/0816*** | (2022.01) |
| ***H04L 41/0893*** | (2022.01) |
| ***H04L 45/586*** | (2022.01) |

(52) U.S. Cl.
CPC ...... *H04L 41/0886* (2013.01); *H04L 41/0816* (2013.01); *H04L 41/0893* (2013.01); *H04L 45/586* (2013.01)

(58) Field of Classification Search
CPC ............................... H04L 45/245; H04L 49/70
See application file for complete search history.

(56) References Cited

U.S. PATENT DOCUMENTS

2012/0033672 A1* 2/2012 Page ..................... H04L 49/552 370/395.53

FOREIGN PATENT DOCUMENTS

| | | | |
|---|---|---|---|
| CN | 102523113 B * | 12/2014 | |
| CN | 106685820 A * | 5/2017 | ............. H04L 45/16 |

OTHER PUBLICATIONS

H3C, "H3C S7500 Series Operation Manual(Release 3100 Series)-(V1.04)" 2007 (Year: 2007).*
"IEEE Draft Standard for Local and metropolitan area networks—Link Aggregation," in IEEE P802.1AX/D4.1, Jun. 2014 , vol. No., pp. 1-315, Jul. 25, 2014. (Year: 2014).*
R. R. R. Junior, M. A. M. Vieira and A. A. F. Loureiro, "Dynamic Link Aggregation in Software Defined Networking," 2018 IEEE Symposium on Computers and Communications (ISCC), Natal, Brazil, 2018, pp. 00615-00620, (Year: 2018).*

* cited by examiner

*Primary Examiner* — Messeret F Gebre
(74) *Attorney, Agent, or Firm* — Slater Matsil, LLP

(57) ABSTRACT

In an example implementation, a network device includes first switch circuitry associated with a first set of physical ports and second switch circuitry associated with a second set of physical ports. The first and second sets of physical ports may collectively form a combined set of physical ports. A communication link may couple the first switch circuitry and the second switch circuitry. A mapping of the first set of physical ports and the second set of physical ports to single set of virtual ports may be stored. One or more processors are configured to receive a transmission on a first physical port of the combined set of physical ports, access the mapping to determine a first virtual port of the single set of virtual ports that corresponds to the first physical port, and generate an indication of the first virtual port as a communication port for the transmission.

20 Claims, 10 Drawing Sheets

| SRC_CHASSIS | DST_CHASSIS | OUT_PORT |
|---|---|---|
| 0 | 2 | 1/0/0 |
| 0 | 3 | 1/0/0 |
| 1 | 2 | 1/0/0 |
| 1 | 3 | 1/0/0 |

Multicast VSF Table for Chassis 1 712

| SRC_CHASSIS | DST_CHASSIS | DST_PORT |
|---|---|---|
| 0 | 2 | 1/0/0 |
| 0 | 3 | 1/0/0 |
| 1 | 2 | 1/0/0 |
| 1 | 3 | 1/0/0 |

Multicast VSF Table for Chassis 0 710

| SRC_CHASSIS | DST_CHASSIS | DST_PORT |
|---|---|---|
| 0 | 2 | HISL |
| 0 | 3 | HISL |
| 1 | 2 | HISL |
| 1 | 3 | HISL |

Multicast VSF Table for Chassis 0
810

| SRC_CHASSIS | DST_CHASSIS | DST_PORT |
|---|---|---|
| 0 | 2 | HISL |
| 0 | 3 | HISL |
| 1 | 2 | HISL |
| 1 | 3 | HISL |
| 0 | 6 | 0/0/0 |
| 0 | 7 | 0/0/0 |
| 1 | 6 | 0/0/0 |
| 1 | 7 | 0/0/0 |

Multicast VSF Table for Chassis 1
812

| SRC_CHASSIS | DST_CHASSIS | DST_PORT |
|---|---|---|
| 0 | 2 | 1/0/0 |
| 0 | 3 | 1/0/0 |
| 1 | 2 | 1/0/0 |
| 1 | 3 | 1/0/0 |
| 0 | 6 | HISL |
| 0 | 7 | HISL |
| 1 | 6 | HISL |
| 1 | 7 | HISL |

VIRTUAL SWITCH FRAMEWORK FOR NETWORK SWITCHING

BACKGROUND

Network devices are used in network infrastructures, providing the interconnection and communication between various devices and network segments. These devices typically include one or more network switches, which direct data traffic between coupled devices based on network protocols and configurations. Scalable and flexible switching solutions that can adapt to changing requirements while maintaining efficient management and operation may be appropriate as networks continue to grow in size and complexity.

Virtual switch frameworks (VSF) allow multiple physical network switches to be logically combined and operated as a single virtual switch. This approach can provide benefits such as aggregation of network resources, simplified management, and improved scalability. However, implementing VSF in network devices often involves complex configurations and may require specialized hardware or software components.

BRIEF DESCRIPTION OF THE DRAWINGS

For a more complete understanding of this disclosure, and advantages thereof, reference is now made to the following descriptions taken in conjunction with the accompanying drawings, in which.

DESCRIPTION

Figure 1:
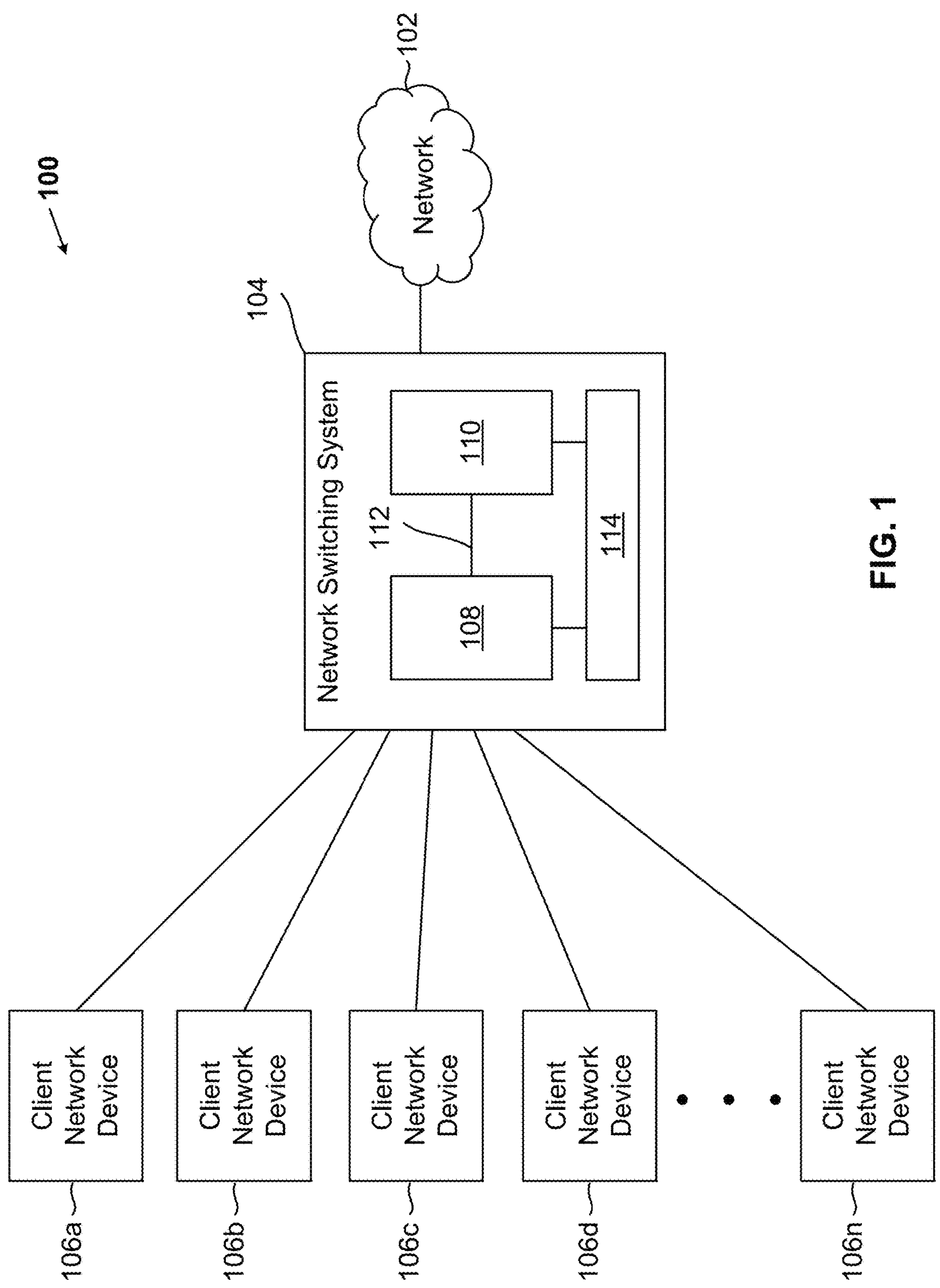
FIG. 1 illustrates a system diagram of a network device, according to some implementations.

The following description sets forth exemplary aspects of the present disclosure. It should be recognized, however, that such description is not intended as a limitation on the scope of the present disclosure. Rather, the description also encompasses combinations and modifications to those exemplary aspects described herein.

Network devices can provide a modular hardware framework that houses various network components such as switches, routers, and other components. Network devices may provide scalability, flexibility, and efficient management of network resources, making the network devices suitable for various types of network infrastructures, including large-scale network infrastructures. The modular configuration supports the insertion and interconnection of various network modules, allowing the network device to adapt to different network configurations.

Managing and configuring network devices can be complex, especially when using multiple VSF members and their interactions. VSF may refer to a technology that allows multiple physical network switches to be logically combined and operated as a single virtual switch. VSF may provide aggregation of network resources, simplify network management, and improve scalability and redundancy in network infrastructures. In some aspects, VSF may provide a unified control plane across multiple physical switches, allowing them to be managed and configured as a single logical entity.

So called conventional solutions for managing network devices involve presenting multiple VSF members to the user, which can lead to increased complexity and potential configuration errors. Network administrators manually configure and manage each VSF member, which can be time-consuming and can cause mistakes. Additionally, the visibility of multiple VSF members can complicate the overall network management process, making the overall network management process difficult for users to achieve a streamlined and efficient network configuration.

In some implementations, the application programming interface (API) instance interacts with the network device and presents a single VSF member to the customer. The API instance refers to a specific implementation of an API that interacts with the network device. The API instance can serve as an intermediary layer that allows external applications, systems, or users to communicate with and control the network device.

This approach simplifies the network configuration and the network management by making the internal complexity of multiple VSF members substantially invisible to the user. As a result, the customer perceives a unified system with, e.g., all ports belonging to a single VSF member, despite the underlying architecture involving multiple hidden chassis and nodes. A hidden internal stack link (HISL) may couple these chassis and nodes. In some implementations, the HISL may be a hardware managed component (e.g., a hardware-level coupling). In some implementations, the HISL may not require a visible external cable to couple the hidden chassis.

By hiding the internal VSF members, the API instance simplifies the network management process, reducing the need for manual configuration and reducing the risk of errors. This abstraction layer allows network administrators to manage the network through a standardized interface, supporting various network management protocols such as Simple Network Management Protocol (SNMP), Network Configuration Protocol (NETCONF), and Representational State Transfer Application Programming Interfaces (RESTful APIs).

The system architecture can be configured as a modular framework, allowing for customization and scalability. In some implementations, the network device can be equipped with various types of modules, such as line cards and service modules. Each of these modules may be configured to provide various functionalities and port densities. For instance, a high-density line card may provide multiple 10 Gbps Ethernet ports, while a service module can provide improved security features like firewall capabilities or intrusion detection. The modular approach allows network administrators to customize the network device to their specific needs and efficiently expand or modify the network capabilities as requirements evolve.

In another implementation, the API instance of the network device provides dynamic reconfiguration. Algorithms for dynamic reconfiguration may be capable of adjusting the configuration of internal VSF members based on real-time or near real-time network conditions. The feature of dynamic reconfiguration provides improved performance and resource utilization across the network device. For example, if a sudden surge in network traffic is be detected, the network device can automatically reallocate resources to handle the increased load, without the need for manual intervention. The dynamic reconfiguration capability may be beneficial in environments with fluctuating network loads, such as cloud computing platforms or large enterprise networks with variable traffic patterns.

The dynamic nature of the network device improves performance and reduces the risk of configuration errors. Traditional static configurations often require manual adjustments, which can be time-consuming and prone to human error. By automating these processes, the network device reduces the need for manual intervention, thereby reducing the likelihood of misconfigurations that can lead at least partially to network downtime or security vulnerabilities.

In some implementations, the network device can have a flexibility in network topology. As an example, the hidden chassis and the hidden nodes within the system can be arranged in various configurations, including star, ring, or mesh topologies. This flexibility allows network architects to configure network layouts that suit their specific requirements. For instance, a star topology may be preferred in a centralized network architecture, while a mesh topology can provide improved redundancy and fault tolerance in a distributed environment. By implementing different topologies, the network device can provide resilience, relatively continuous network operation, e.g., in the event of hardware failures.

In certain implementations, the network device of this disclosure may improve user experience by reducing the apparent complexity of the network device and reducing potential configuration errors. The streamlined approach to network management may provide a more efficient and user-friendly solution for managing large-scale network infrastructures.

Turning to the figures, FIG. 1 illustrates a system diagram 100 of a network device 104. The system diagram 100 includes an external network 102, a network device 104, and multiple client network devices 106*a*-106*n*.

The network device 104 may be coupled to the external network 102, which may represent a broader network infrastructure. This coupling allows the network device 104 to manage network traffic between the client network devices 106*a*-106*n* and the external network 102.

The computing system 100 may be used to transmit network communication through a virtual port (such as one of virtual ports of a set 114 of virtual ports), according to some implementations. The computing system 100 may be implemented in one or more electronic devices and/or systems. Examples of electronic devices and systems may include a range of devices and/or systems that may be coupled to a network 102 or may interact with the network 102. The electronic devices may be broadly categorized into a network device 104, client devices 106, and other appropriate devices and/or systems. Although FIG. 1 shows computing system 100 including a single network device 104, computing system 100 may include any suitable number of the network devices 104. This disclosure also may refer to the network device 104 in the singular or the plural.

The network device 104 may be a processing system that may facilitate the transfer of data across the network 102. Examples of the network device 104 may include routers that direct data packets along the network 102, switches that couple multiple devices to the network 102 and manage data traffic, access points that provide wireless connectivity, firewalls that provide network security, and modems that couple networks 102 to the internet. Additionally, the network device 104 may be configured to perform a range of functionalities, including those typically associated with hosts and other devices and/or systems. For example, the network device 104 such as a multifunctional router may serve as a server, hosting applications or services directly on the network device 104. In some implementations, the network switches may provide data routing, switching capabilities, and host network management software and tools. The network device 104 may perform one or more roles, thereby improving the efficiency and flexibility of network resource utilization. The network devices may vary in terms of their data transfer speed, range of connectivity, security features, or the specific network protocols they support.

In some implementations, the network device 104 can include a first network switch 108 and a second network switch 110. The network switches 108 and 110 may be interconnected by a communication link 112. In some implementations, the communication link 112 allows for internal communication between the first network switch 108 and the second network switch 110.

Figure 3:
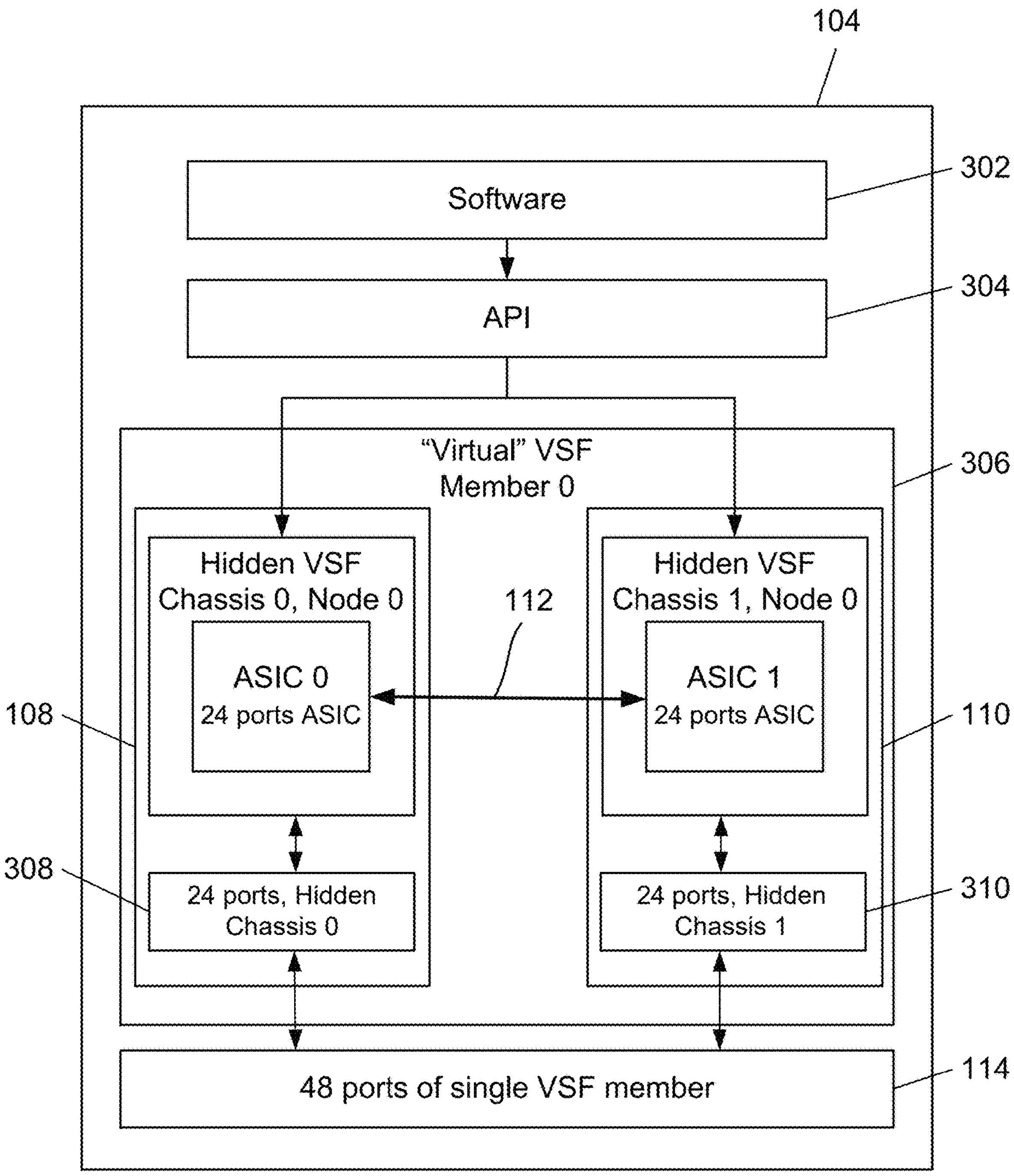
FIG. 3 illustrates an example block diagram of a network device with virtual switch framework, according to some implementations.

As an example, the network device 104 can include the two network switches 108 and 110 (which can be hidden chassis) and a chassis labeled "Chassis 0" in FIG. 3 that includes a software component that represents one VSF member. The networking device 104 can include an API instance that conceals the internal VSF member.

In some implementations, the two network switches 108 and 110 can each include application-specific integrated circuits (ASICs), which can be interconnected by the communication link 112, e.g., a hidden stack link. In some implementations, each ASIC can include 24 ports associated with each network switch 108 and 110. In some implementations, the customer sees 48 ports, all belonging to a single VSF member 306. In some implementations, the architecture described herein allows the network device 104 to be presented to the customer (e.g., using the client devices 106) as a single virtual switch with 48 ports, while internally managing two separate 24-port ASICS.

In some implementations, the network device 104 may employ software-defined networking (SDN) protocols to manage routing of network traffic for the client network devices 106*a*-106*n*. This may provide a more granular control over traffic flows and quality of service, potentially improving the performance and user experience for the client network devices 106*a*-106*n*.

The scalability of the network device 104 may allow for a relatively seamless expansion to accommodate growth in the number of client network devices 106*a*-106*n*. As additional switches (which can include additional ASICs) are added to the system, the network device 104 may automatically incorporate these new elements, maintaining a relatively consistent interface and level of service for the client network devices 106*a*-106*n*.

Examples of the client devices 106 include servers that host websites or applications, personal computers used by individuals or organizations, mobile devices such as smartphones and tablets, and Internet of Things (IOT) devices like smart home appliances, wearable devices, and connected vehicles. Additional examples of the client devices 106 include storage devices such as network attached storage devices or cloud storage servers, peripheral devices such as printers or scanners that may be accessed over the network 102, and specialized devices such as security cameras or environmental sensors that send data over the network 102. In some implementations, the client devices 106 may vary in terms of their processing power, storage capacity, operating system, the specific applications they run, data types they manage, or the specific network interfaces they use.

FIG. 1 illustrates a network configuration with multiple client devices 106 interconnected through the network device 104 that may be coupled to the network 102. A first client device 106*a*, a second client device 106*b*, a third client device 106*c*, and a fourth client device 106*d* may be shown as being coupled to the network device 104. Additionally, an Nth client device 106*n* is shown, indicating the network capability to communicatively couple to an unspecified number of client devices 106, thereby representing a scalable network system. The network device 104 may be communicatively coupled to the network 102, through which data exchange and communication between the network devices (e.g., the network device 104) may be performed. The computing system 100 may facilitate a dynamic communication network that may adapt to the varying demands of the coupled network device 104 and the data that the network device 104 transmits to and from the client devices 106 and the network 102.

The computing system 100 may be utilized in any data processing scenario, including stand-alone hardware, mobile applications, or combinations thereof. The computing system 100 may be used in a computing network, such as a public cloud network, a private cloud network, a hybrid cloud network, other forms of networks, or combinations thereof. As an example, the methods provided by the computing system 100 may be provided as a service over a network by, for example, a third party. The computing system 100 may be implemented on one or more hardware platforms, in which the modules in the system may be executed on one or more platforms. Such modules may run on various forms of cloud technologies and hybrid cloud technologies or be offered as a Software-as-a-Service that may be implemented on or off a cloud network.

In some aspects, the network device 104 may be configured to manage network traffic in a variety of network environments, including but not limited to, local area networks (LANs), wide area networks (WANs), and cloud-based networks. The network device 104 may also support various network protocols, such as Internet Protocol (IP), Transmission Control Protocol (TCP), and User Datagram Protocol (UDP), among others.

Figure 2:
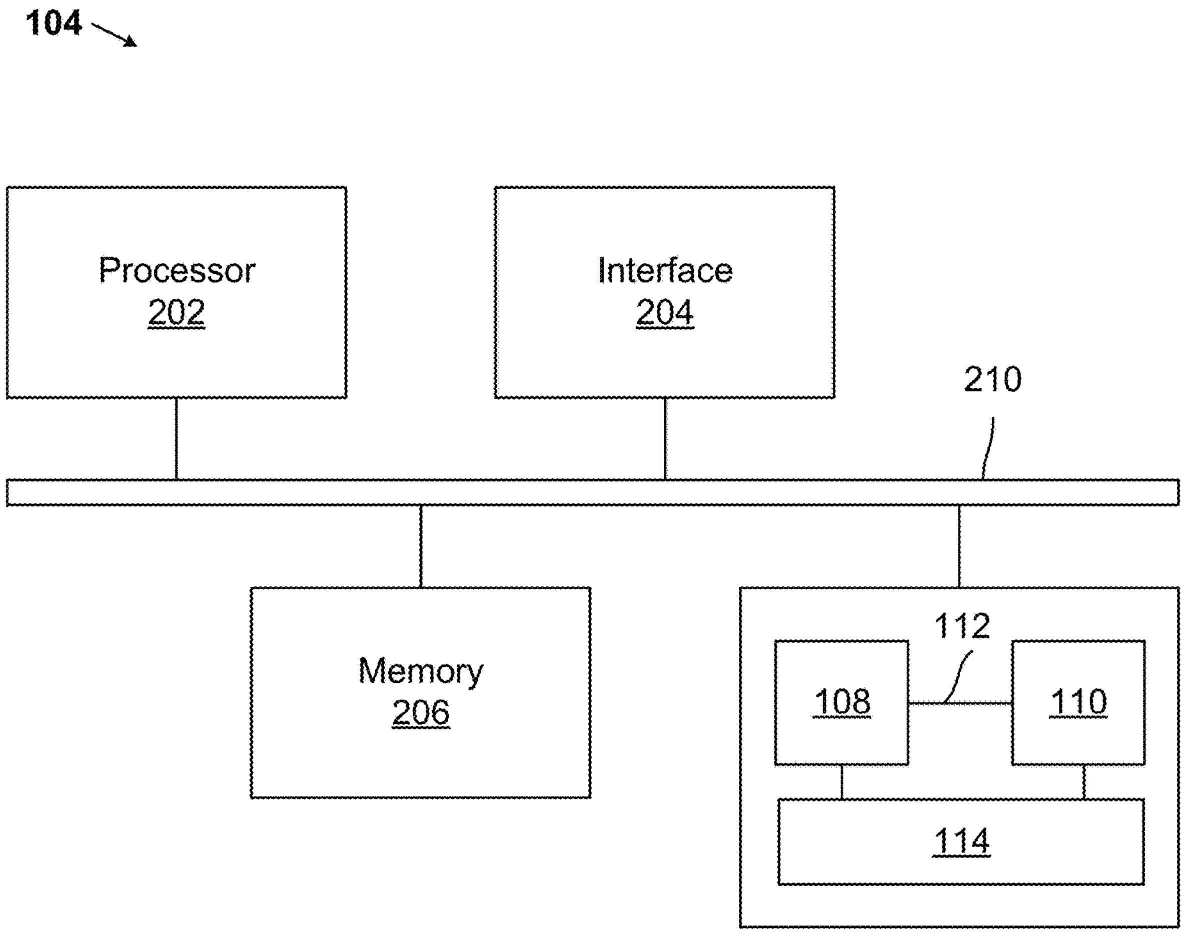
FIG. 2 illustrates a block diagram of a network device, according to some implementations.

Referring to FIG. 2, a block diagram of a network device 104 is illustrated, according to some implementations. The network device 104 may include a processor 202, an interface 204, and a memory 206. The processor 202 and interface 204 may be coupled to a connector 210 (which can be a communication pathway or a common bus). In some implementations, the memory 206 may be also coupled to the connector 210.

The network device 104 includes a first network switch 108 and a second network switch 110, which may be interconnected by a communication link 112. The communication link 112 allows for internal communication between the first network switch 108 and the second network switch 110.

The first network switch 108 may include first switch circuitry that includes a first set of physical ports. Similarly, the second network switch 110 may include second switch circuitry that includes a second set of physical ports. These physical ports may be used for coupling to other network devices or systems, facilitating the transfer of network traffic.

As an example, the physical ports of the first network switch 108 and the second network switch 110 may be communicatively coupled to the set of virtual ports 114 such that the physical ports are mapped to the set of virtual ports 114.

The network device 104 also includes one or more processors (e.g., the processor 202). The processor 202 may be configured to control the operations of the first network switch 108 and the second network switch 110, managing the routing of network traffic and performing other network management tasks.

In some implementations, the memory 206 may be treated as a first storage and a second storage in various configurations of physical memory, i.e., within one or more memory devices. In some implementations, the second storage may store a program for execution by the one or more processors (e.g., the processor 202). The program may include instructions for managing the network device 104. The instructions may include instructions for mapping of a first set of physical ports of the network device 104 and a second set of physical ports of the network device 104 to a single set of virtual ports. The instructions may include instructions for presenting mapping of the first set of ports and the second set of ports as the single set of virtual ports.

In some aspects, the network device 104 may be configured to handle a variety of network traffic types, including unicast, multicast, broadcast traffic, and other suitable traffic types. The system may also support various network protocols, such as Internet Protocol (IP), Transmission Control Protocol (TCP), and User Datagram Protocol (UDP), among others.

In some implementations, the network device 104 may be implemented in a variety of hardware configurations. For example, the first network switch 108 and the second network switch 110 may be implemented as standalone network switches, integrated network switches within a larger network device, or as virtual network switches within a virtualized network environment. The specific implementation of the network device 104 may depend on the specific requirements of the network environment in which it may be deployed.

In some implementations, a connector 210 may be any suitable combination of buses and/or other types of wired or wireless connectors. In certain implementations, the connector 210 may include one or more buses, such as one or more PCI-Express buses.

In some implementations, the processor 202 may coordinate the operations of the various parts of the network device 104. As an example, the processor 202 may manage the routing of network traffic between the first network switch 108 and the second network switch 110 using SDN protocols. The network device 104 may utilize SDN protocols to manage routing of network traffic between the first network switch 108 and the second network switch 110.

In some aspects, the controller (e.g., the processor 202) may include programming instructions stored in the memory 206. These instructions may be executed by the processor 202 to perform various operations of the network device 104. For example, the programming instructions may include instructions for receiving a transmission on a first physical port of a combined set of physical ports of the network device 104. The instructions may include instructions for accessing a mapping to determine a first virtual port of a single set of virtual ports that corresponds to the first physical port. The instructions may include instructions for generating an indication of the first virtual port as a communication port for the transmission, where the indication of the first virtual port hides an identity of the first physical port.

In some implementations, the first storage and the second storage may be the same storage (e.g., the memory 206). This configuration may simplify the storage architecture of the network device 104, potentially reducing system complexity and improving efficiency. The use of a single storage unit for both the first and second storage may also facilitate faster data access and retrieval, potentially improving the performance of the network device 104.

Referring to FIG. 3, a block diagram of a network device 104 is illustrated, according to some implementations. The network device 104 may include two chassis units, each including one node. Here the chassis units are labeled as "Chassis 0" and "Chassis 1." Within each chassis, Node 0 of Chassis 0 and Node 0 of Chassis 1 may be coupled by a communication link 112. In some implementations, the communication link 112 may serve as a HISL between the first network switch 108 and the second network switch 110 (which may include ASIC 0 and ASIC 1, respectively).

The HISL may be directly coupled to both ASIC 0 and ASIC 1 within the network device 104 in a way that is not visible to the user. In some implementations, the link 112 may be encapsulated within hardware configuration of the network device 104. The HISL may provide sufficient bandwidth to move ingress traffic from the network switches 108 and 110 to one another without losing or substantially without losing any packet information.

In some aspects, the HISL may function as a high-speed, relatively lossless communication channel between the nodes within each chassis. This capability may allow the network device 104 to handle high volumes of network traffic efficiently, potentially reducing latency and improving overall system performance.

The use of the HISL for internal communication may also improve the security of the network device 104 because the internal communication between the nodes may be hidden from external devices and systems. This concealment may provide an additional layer of protection against potential security threats.

In some implementations, the HISL allows the network device 104 to present itself as a single virtual switch while internally managing multiple physical network switches 108 and 110, which may include ASIC circuitries. When configuring VSF tables for traffic routing, the network device 104 may use the HISL as a destination port for internal traffic between different chassis or nodes.

For example, in a multicast configuration, the VSF table for one chassis may route all traffic to the other chassis through the HISL, while another chassis may use a combination of the HISL and physical ports depending on the destination. The flexible routing capability may allow the network device 104 to efficiently manage complex network topologies while maintaining the appearance of a single, unified switch to external systems and users.

The HISL may also facilitate the scalability of the network device 104. As additional switches or ASICs may be added to the system, the HISL may provide a consistent and high-performance method for inter-switch communication, allowing the system to grow without significantly increasing complexity or compromising performance. By leveraging the HISL, the network device 104 may achieve a balance between the benefits of a distributed, multi-switch architecture and the relative straightforwardness of managing a single logical entity.

In some implementations, the network device 104 may include a first storage that stores a mapping of virtual ports 114 to at least one of the first set 308 of ports in the first network switch 108 or the second set 310 of ports in the second network switch 110. The mapping presents at least one of the first set 308 of ports or the second set 310 of ports as one set of virtual ports 114. This mapping may be used to translate between virtual ports 114 and physical ports (e.g., 308 and/or 310), allowing the network device 104 to manage network traffic in a flexible and efficient manner.

In some aspects, the network device 104 may include a software component 302 (e.g., software) and an API 304. In some implementations, the software component 302 interacts directly or indirectly with the API 304. The software 302 may include a core logic for managing the VSF functionality.

In some implementations, the software 302 uses the API 304 to expose its functionality and capabilities to external systems and management interfaces. In some implementations, when commands or queries come through the API 304, the software 302 processes these requests and implements the necessary actions across the VSF member 306 and underlying physical switches (e.g., the first and second switches 108 and 110, respectively).

In some implementations, the software 302 may manage a state of the VSF system, using the API 304 to communicate this state to external systems. In some implementations, configuration changes made via the API 304 may be processed and implemented by the software 302.

In some implementations, while the API 304 provides the interface for abstraction, the software 302 implements the logic to make multiple physical switches (e.g., the first and second switches 108 and 110, respectively) appear as a single virtual switch. In some aspects, the API 304 may be configured to provide a unified management interface for configuring and monitoring both the first network switch 108 and the second network switch 110 as a single logical entity. The API 304 may receive commands for the single virtual switch and translate these commands into separate instructions for each of the first network switch 108 and the second network switch 110, while preserving the representation of a single virtual switch.

This API 304 may receive commands intended for what appears to be a single switch. In a hidden manner, the API 304 may process these commands and convert them into separate, specific instructions for each of the physical network switches (e.g., the first network switch 108 and the second network switch 110) that comprise the virtual switch.

For example, when a user issues a command to configure a port on the virtual switch, the API 304 may interpret this command and generate the appropriate instructions for the specific physical switch 108 or 110 where that port actually resides. Similarly, if a command affects multiple ports across both physical switches 108 and 110, the API 304 may generate separate instructions for each switch, while maintaining the representation of a single switch (having the virtual ports 114) to the user.

The API 304 may thus serve as an intermediary layer, translating high-level, unified commands into the specific, low-level instructions required by each individual network switch, without revealing the internal complexity to the end user.

In some implementations, the API 304 may be configured with a translation layer that maps high-level commands for the virtual switch to low-level instructions for each physical switch 108 and 110. The translation layer may maintain a mapping between virtual ports and physical ports, allowing administrators to reference ports using a unified numbering scheme substantially regardless of which physical switch 108 or 110 where the port resides.

The API 304 may implement a set of abstraction functions that hide the complexity of, e.g., the dual-ASIC architecture. For example, when configuring a VLAN, the API 304 may automatically propagate the VLAN configuration to both network switches 108 and 110, allowing consistency across the entire system.

In some implementations, the API 304 may include state synchronization mechanisms to maintain a coherent view of the system across both network switches 108 and 110. The state synchronization mechanisms may include implementing distributed locking mechanisms or consensus algorithms to facilitate configuration changes being applied atomically across the entire network device 104.

The API 304 may provide a set of unified management functions that operate on the virtual switch as a whole. These functions may include operations such as firmware updates, system diagnostics, and performance monitoring. The API 304 may handle the complexity of performing these operations across multiple physical switches, presenting a single, consistent interface to management tools and administrators.

In some aspects, the API 304 may implement role-based access control (RBAC) that applies uniformly across both network switches 108 and 110. In some implementations, the RBAC may allow administrators to define access policies at the virtual switch level, with the API 304 handling the translation of these policies to the appropriate configurations on each physical switch 108 and 110.

The API 304 may provide a unified event and logging system that aggregates information from both network switches. Such aggregation may allow administrators to view system events and logs as if they were coming from a single switch, simplifying troubleshooting and monitoring tasks.

In some implementations, the API 304 may include a configuration validation layer that checks the consistency and feasibility of configuration changes across the entire virtual switch before applying them. The validation layer may help prevent misconfigurations that may arise from the complexity of the underlying dual-ASIC architecture.

The API 304 may provide a unified statistics and telemetry interface that aggregates data from both network switches 108 and 110. This may allow for comprehensive performance monitoring and capacity planning at the virtual switch level, without requiring administrators to manually combine data from multiple sources.

By configuring the API 304 as described herein, the network device 104 may present a relatively seamless, unified interface to network administrators and management tools. This approach may provide a more intuitive and efficient user experience, while having the performance and scalability benefits of the underlying architecture (e.g., a dual-ASIC architecture).

The network device 104 may utilize a formula to assign chassis and node identifiers. In some implementations, the network device 104 may employ a specific formula for assigning chassis and node identifiers. This formula may be used for hiding the presence of multiple ASICs within the network device 104, presenting them as a single unified virtual switch.

The formula for assigning chassis identifiers may be expressed as:

$$\text{Chassis ID} = 2X + Y,$$

where X represents the physical chassis number and Y represents the node number within that physical chassis.

In some implementations, the controller may assign at least one of a unified chassis identifier or a node identifier to logically represent the first network switch 108 and second network switch 110 as nodes in a single virtual switch 306.

The formula for assigning node identifiers may be:

$$\text{NODE ID} = 0$$

This approach to identifier assignment may allow the network device to uniquely identify each component while maintaining a logical representation of a single virtual switch. By using the above formula, the system may effectively map multiple physical ASICs or switches to a unified logical structure.

This identifier assignment method may be particularly useful when dealing with dual-ASIC configurations or when scaling the system to include additional switches. It may allow the system to maintain a consistent external interface while internally managing a more complex hardware arrangement.

By employing the above formulae, the network device may be able to present a relatively simplified topology to network administrators, potentially reducing configuration complexity and the risk of errors. At the same time, it may provide the flexibility needed to manage and route traffic efficiently across multiple physical components.

By setting the Node ID to 0 for all nodes, the system may present a simplified view of the network topology to external management systems and users. This approach may hide the internal complexity of multiple physical nodes within each chassis (e.g., Nodes 0 within Chassis 0 and Chassis 1).

In some implementations, setting the Node ID to 0 may allow the network device 104 to maintain compatibility with existing management software that expects to interact with a single-node switch 306. Setting the Node ID to 0 may reduce the need for relatively extensive modifications to higher-level software components.

By using a consistent Node ID of 0, the network device 104 may effectively abstract the internal multi-node architecture. Such abstraction may allow the network device 104 to present itself as a single logical entity, despite the underlying potential complexity of multiple ASICs or physical network switches 108 and 110.

With all nodes having an ID of 0, the simplified routing logic within the VSF tables may allow the network device 104 to focus on chassis-level routing decisions rather than node-level routing, potentially improving efficiency and reducing complexity in the routing algorithms.

In some implementations, setting the Node ID to 0 may allow for easier scalability of the network device 104. As new chassis and/or ASICs may be added to the network device 104, the new chassis and/or ASICs may be integrated into the existing framework without requiring changes to the node identification scheme.

In some implementations, setting the Node ID to 0 may relatively align with the VSF implementation, where the focus may be on presenting multiple physical switches (e.g., network switches 108 and 110) as a single virtual switch 306. By using a consistent Node ID, the network device 104 may reinforce this unified view.

Using a single Node ID may reduce the complexity of configuration tasks for network administrators. The network administrators may only need to consider chassis-level configurations, potentially simplifying network management tasks.

In some implementations, the chassis identifier formula may allow the network device 104 to accommodate up to, e.g., 32 unique chassis identifiers, as the maximum chassis ID in many implementations may be 31. The node identifier, consistently set to 0, may help simplify the representation of the network device 104 to external management interfaces and users.

In some implementations, the network device 104 may present 48 ports (e.g., the set 114 of virtual ports) to the customer while internally managing two 24-port ASICs (e.g., sets 308 and 310 of physical ports). This configuration may allow for greater flexibility in hardware design and cost optimization. As an example, the first network switch 108 may include one 24-port ASIC (e.g., ASIC 0), while the second network switch 110 may include another 24-port ASIC (e.g., ASIC 1). The controller may manage the ASIC 0 and the ASIC 1 in a way that presents them as a single 48-port switch to external systems and users.

The communication link 112 between the first network switch 108 and the second network switch 110 may facilitate high-speed communication between the two ASICs. Such internal communication may allow the network device 104 to efficiently manage traffic across all 48 ports, potentially improving overall performance and reducing latency of the network device 104.

In some implementations, the network device 104 may use the unified chassis identifier and node identifier in conjunction with the virtual port mapping stored in the first storage. Such combination may allow the network device 104 to accurately route traffic between the virtual ports presented to the customer and the physical ports on the two 24-port ASICs. The controller may use this information to manage traffic flow, load balancing, and failover scenarios, potentially improving the reliability and performance of the network device 104.

In some implementations, the network device 104 may be expanded to incorporate additional network switches. For instance, a third network switch may be added to the network device 104, including a third set of physical ports. The mapping stored in the first storage may be updated to incorporate the third set of physical ports into the set of virtual ports. This expansion may allow the system to scale up its network capacity while maintaining the unified virtual switch presentation to the customer. The addition of the third network switch may be managed by the API 304, which may receive a configuration request to modify the mapping and update the mapping according to the received configuration request. This approach may allow for dynamic expansion of the network device 104, potentially improving its scalability and flexibility. Even though adding only the third network switch is described, any number of network switches can be added, such as a fourth network switch, a fifth network switch, etc.

The formula used for assigning chassis and node identifiers may also support scaling beyond two ASICs or switches. As the network device 104 expands, the formula (Chassis ID=2X+Y) may continue to generate unique identifiers for each additional chassis and node. This scalability in identifier assignment may allow the network device 104 to maintain a consistent logical representation as it grows.

When scaling to support more than two ASICs or switches, the VSF tables may need to be expanded accordingly. For each additional switch (that may include an ASIC) added to the topology, new entries may be appropriate in the VSF tables of all existing switches to maintain proper routing paths. This expansion of VSF tables may allow the network device 104 to manage traffic routing across a larger number of physical switches while still presenting a unified interface to external management systems and users.

For example, in a configuration with three dual-ASIC switches in a ring topology, a multicast VSF table of each switch may need to include entries for routing to four other chassis (two for each of the other switches in the ring). This may result in eight entries per switch, compared to the four entries needed in a two-switch configuration.

The HISL may provide scaling of the network device 104. As additional switches or ASICs may be added, the HISL may provide a relatively consistent and high-performance technique for inter-switch communication. This may allow the network device 104 to grow without substantially increasing complexity or compromising performance. The HISL may support various network topologies, such as star, ring, or mesh configurations, providing flexibility as the network device 104 scales.

In some implementations, a star topology may be configured such that the first network switch 108 acts as a central hub, with the second network switch 110 and potentially additional switches coupled directly to it. This configuration may provide improved fault tolerance by allowing traffic to be rerouted through the central switch if one of the peripheral switches fails.

In some implementations, a ring topology may be implemented, where the first network switch 108 and the second network switch 110 may be coupled in a circular fashion with other switches. This arrangement may offer improved redundancy by providing multiple paths for data to travel. If one link in the ring fails, traffic may be rerouted in the opposite direction around the ring, maintaining network connectivity.

The network device 104 may also support a mesh topology, where each switch may be coupled to multiple other switches. This interconnected structure may provide the high level of redundancy and fault tolerance. In a full mesh topology, every switch may have a substantially direct coupling to every other switch, allowing for multiple alternate paths in case of switch or link failures.

In some aspects, the network device 104 may implement a hybrid topology, combining elements of star, ring, and mesh configurations to optimize redundancy and fault tolerance based on specific network requirements. For example, important switches may be coupled in a mesh pattern for higher resilience, while less important switches may be coupled in a star or ring pattern.

The communication link 112 between the first network switch 108 and the second network switch 110 in these topologies may provide an additional path for traffic flow, further improving redundancy and fault tolerance. In case of a failure in one of the external links, the system may reroute traffic through the communication link 112, maintaining network connectivity.

The various topology options may allow network architects to design layouts that best suit their specific redundancy and fault tolerance requirements. The flexibility to choose and implement different topologies may allow the network device 104 to adapt to diverse network environments and provide robust, resilient network infrastructures.

In some implementations, the network device 104 may support up to, e.g., ten devices in a chain or ring topology. As the network device 104 scales, the chassis numbering may continue to follow the established pattern. For example, if a third dual-ASIC switch may be added to a topology, it may be represented as chassis 4 and 5 internally, while appearing as a single additional chassis to the user.

In some implementations, SDN can provide dynamic, programmatically efficient network configuration to improve network performance and monitoring. In the network device 104 described herein, SDN protocols can be utilized to improve the management and routing of network traffic between the first network switch 108 and the second network switch 110.

SDN can complement the system ability to dynamically adjust configurations based on real-time or near real-time network conditions. By using SDN protocols, the controller (e.g., the processor 202) can make informed decisions about traffic routing, load balancing, and resource allocation across the physical switches (e.g., 108 and 110) that correspond to the single virtual switch.

In some implementations, the controller (e.g., the processor 202) may SDN to manage the routing of network traffic using the communication link 112. The controller may include an SDN controller function that maintains a higher level view of the network topology, including the internal structure of the first network switch 108 and the second network switch 110.

The SDN controller function may use protocols such as OpenFlow to communicate with the network switches 108 and 110. Through these protocols, the controller may dynamically program the forwarding tables of each switch 108 and 110, determining how packets may be routed between the switches 108 and 110 and through the communication link 112.

SDN can facilitate the system API-driven approach, where network administrators can manage the network through a standardized interface, e.g., the interface 204. The use of SDN protocols can improve this capability, allowing for more granular control and automation of network functions while maintaining the abstraction of a single virtual switch.

In some implementations, the SDN configuration may allow fine-grained control over traffic flows. For example, the control module 210 may set up flow rules that direct certain types of traffic through specific paths within the network device 104. This may allow load balancing between the first network switch 108 and the second network switch 110, potentially improving overall performance and resource utilization in the network device 104.

The SDN approach may also facilitate the implementation of quality of service (QoS) policies across the network device 104. The controller may use SDN protocols to configure priority queues and traffic shaping rules on both network switches 108 and 110, allowing relatively consistent treatment of traffic across the computing system 100.

In some aspects, the SDN implementation may improve ability of the network device 104 to respond to network changes or failures. The controller may relatively continuously monitor the status of the network switches 108, 110 and the communication link 112. If a failure or congestion may be detected, the SDN controller function may relatively rapidly reconfigure routing paths to maintain network connectivity and performance.

As additional switches or ASICs may be added to the network device 104, the SDN controller function may automatically discover and incorporate these new components into its network view. This may allow for a relatively seamless expansion of the network device 104 while maintaining a relatively centralized control over routing decisions.

In some implementations, the SDN approach may allow advanced network functions such as network slicing. The controller may use SDN protocols to create virtual network segments across the physical infrastructure of the network switches 108 and 110. This may allow for the logical separation of different traffic types or customer networks while utilizing the same physical hardware.

The SDN implementation may also facilitate integration with external SDN controllers or orchestration systems. The network device 104 may expose the API that allow higher-level management systems to influence routing decisions and network policies. This approach may allow the network device 104 to participate in larger, software-defined data center environments.

By leveraging SDN protocols for routing management, the network device 104 may achieve greater flexibility and programmability in its network operations. This approach may allow for more flexible and efficient control of network resources while maintaining compatibility with existing SDN-based management tools and workflows.

Figure 4:
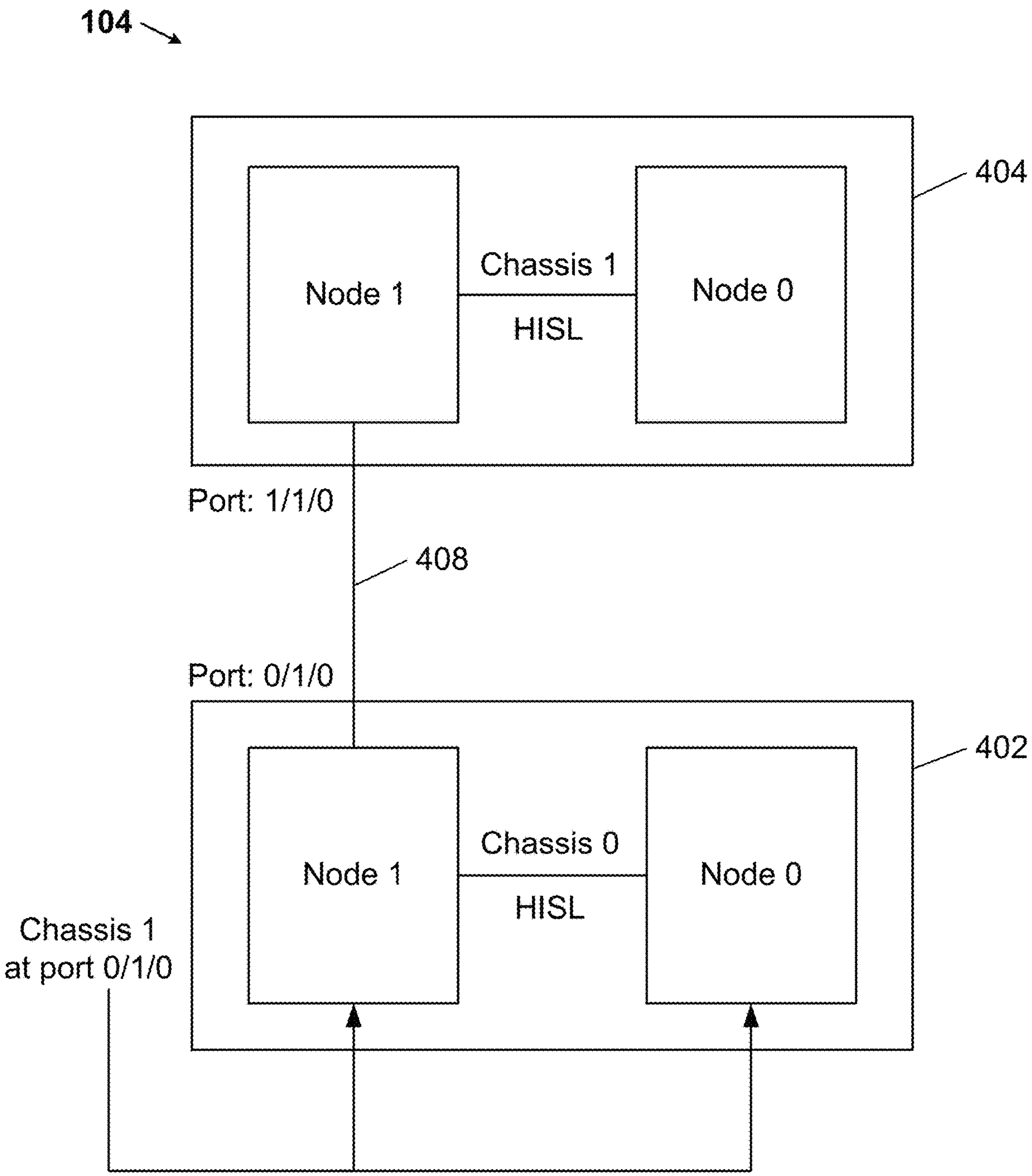
FIG. 4 illustrates an example block diagram of a network device with multiple chassis and nodes, according to some implementations.

Referring to FIG. 4, a block diagram of a network device 104 is illustrated. The network device 104 may include multiple chassis units, e.g., chassis 402 and 404. In some aspects, each chassis 402 or 404 in the network device 104 may contain two nodes, labeled as Node 0 and Node 1.

Each chassis 402 or 404 may correspond to the configuration of the network device 104 illustrated in FIG. 3 and each Node 0 or Node 1 of each chassis 402 or 404 may correspond to the first and second network switches 108 or 110, respectively. As an example, the Node 0 of chassis 402 may correspond to the first network switch 108. In some implementations, the Node 1 of chassis 404 may correspond to the second network switch 110.

Within each chassis, Node 0 and Node 1 may be interconnected by the HISL, facilitating internal communication between the nodes within the same chassis. This configuration may allow for efficient data transfer and coordination between the nodes within each chassis 402 and 404, potentially improving the performance and reliability of the network device 104.

In some implementations, the network device 104 may handle unicast and multicast configurations through VSF tables. These tables may be used for managing traffic routing across the multiple physical switches that comprise the virtual switch 306.

Figure 5:
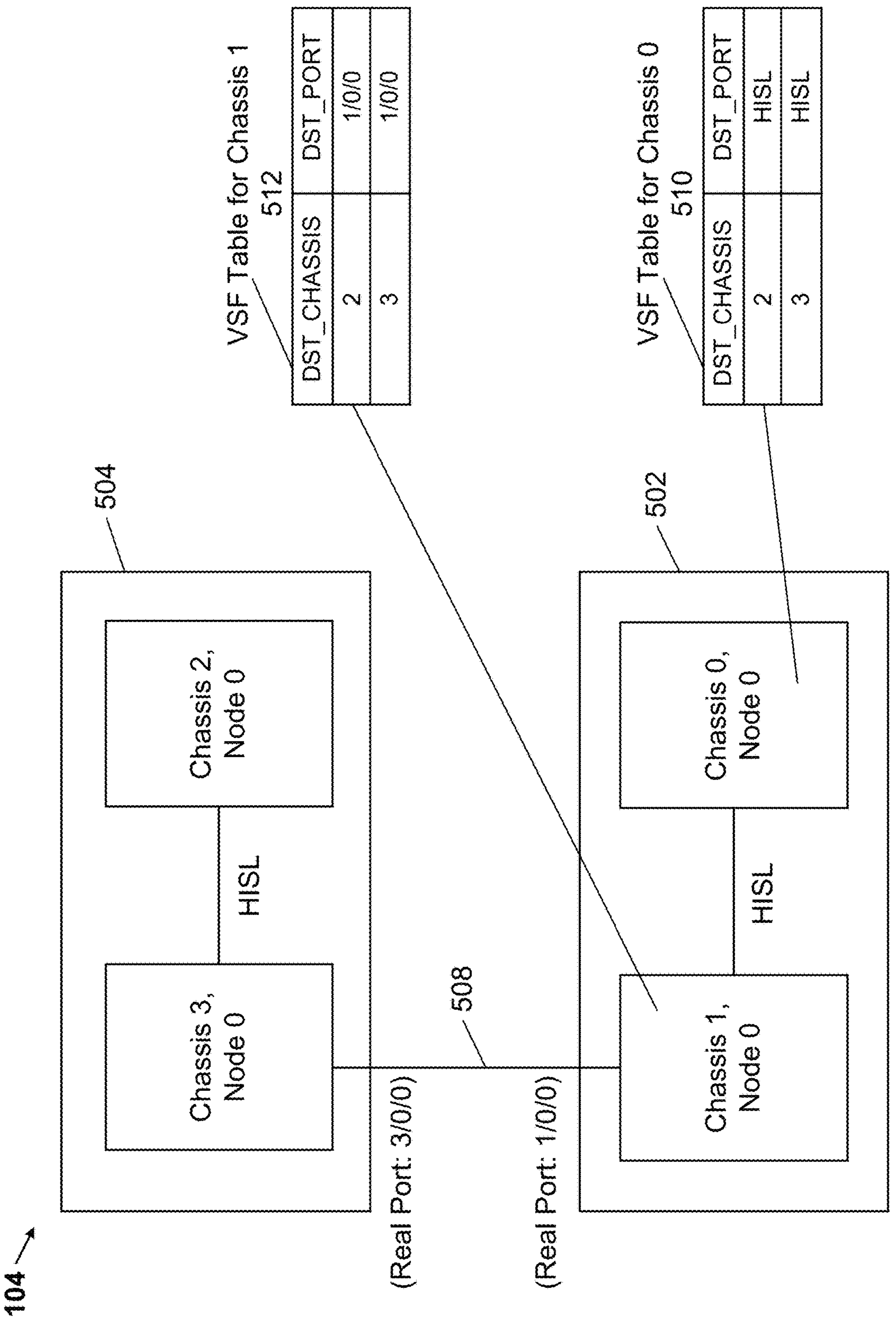
FIG. 5 illustrates an example block diagram of a network device with hidden links and VSF tables, according to some implementations.

Referring to FIG. 5, a block diagram of a network device 104 handling unicast configuration is illustrated. The network device includes two physical switches 502 and 504, each including two nodes where each node is associated with a set of physical ports. In some implementations, the two physical switches 502 and 504 may be coupled by an inter-switch link 508. In some implementations, the switch 502 includes Chassis 0 and Chassis 1, while the switch 504 contains Chassis 2 and Chassis 3. This configuration allows the network device 104 to present itself as a single virtual switch while actually including multiple physical switches.

In some implementations, the chassis 0 and 1 may represent the two nodes of a single physical switch 502, while appearing as two chassis of a single virtual switch to external management. In some implementations, the chassis 2 and 3 may represent the two nodes of a single physical switch 504, while appearing as two chassis of a single virtual switch to external management.

For unicast configurations, the network device 104 may utilize a VSF table (e.g., a VSF table 510 and/or a VSF table 512) that maps source chassis to destination chassis and corresponding output ports. In some implementations, the controller may instruct the network device 104 to route traffic from one chassis to another chassis through a specific port. The network device 104 may then translate this instruction into multiple entries in the VSF table to account for the presence of multiple physical switches 502 and 504.

For unicast configurations, the tables 510 and 512 may map source chassis to destination chassis and corresponding output ports. In some implementations, the table 510 may be associated with Chassis 0, while the table 512 may be associated with Chassis 1. In some implementations, each table 510 and 512 includes four entries, showing different combinations of source and destination chassis numbers (0, 1, 2, 3) with a consistent output port of 1/0/0.

In some implementations, in a dual-ASIC configuration, a single routing instruction may result in two entries in the VSF table 510. As an example, the first entry may instruct to route data packets from the source chassis 0 to the destination chassis 2 using the output port 1/0/0. In some implementations, the second entry in the VSF table 510 may instruct to route data packets from the source chassis 0 to the destination chassis 3 using the output port 1/0/0.

In some implementations, a single routing instruction may result in two entries in the VSF table 512. As an example, the first entry may instruct to route the data packets from the source chassis 1 to the destination chassis 2 using the output port 1/0/0. In some implementations, the second entry in the VSF table 512 may instruct to route the data packets from the source chassis 1 to the destination chassis 3 using the output port 1/0/0.

In some implementations, when a packet is sent from one chassis to another, the network device 104 first determines the source and destination chassis. In some implementations, the network device 104 then consults the appropriate VSF table-if the packet originates from Chassis 0 or 1, the network device 104 may use the table 510; if the packet originates from Chassis 2 or 3, the network device 104 may use the table 512. Based on the destination, the table indicates which output port to use. As an example, all entries may show output port 1/0/0, which may represent the inter-switch link 508. The packet may be then forwarded to the specified output port.

In some implementations, the ASIC API may configure the VSF tables 510 and 512. As an example, the ASIC API may configure the destination chassis 2 and 3. This allows both destination chassis 2 and 3 to be properly configured in the tables 510 and 512, even though they may be physically in the switch 504 that may be different from the switch 502.

The configuration illustrated in FIG. 5 allows the network device 104 to internally manage a relatively complex routing across multiple physical components while presenting a simplified, unified interface to external systems and users. The VSF tables 510 and 512 translate between the internal physical reality and the external virtual representation of the network device 104.

As described above, in unicast communication, each packet has a single source and a single destination address. When a packet arrives, the network device 104 identifies the destination address, consults the appropriate VSF table 510 and/or 512 to determine which output port to use, and sends the packet only to that specific output port. Such configuration makes unicast efficient for point-to-point communication, as each packet traverses the network only once, going directly to its intended node.

Figure 6:
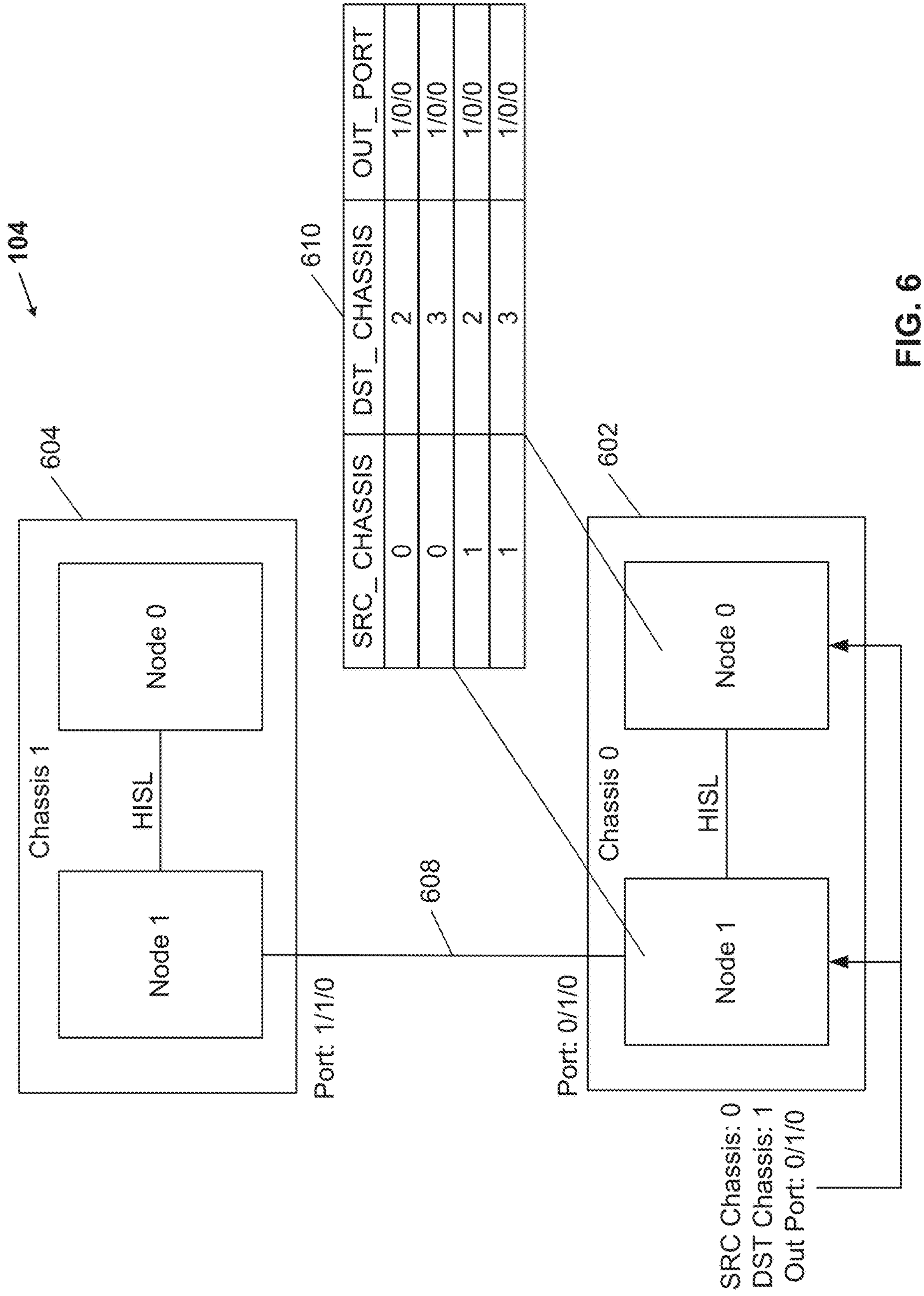
FIG. 6 illustrates an example configuration diagram for a dual-ASIC switch in a Virtual Switch Framework topology, according to some implementations.

Referring to FIG. 6, a block diagram of a network device 104 is illustrated. More specifically, FIG. 6 illustrates a configuration diagram for a dual-ASIC switch in a VSF topology. The diagram depicts two chassis 602 and 604, each containing two nodes. The chassis units 602 and 604 may be labeled as "Chassis 0" and "Chassis 1," respectively. Within each chassis 602 and 604, Node 0 and Node 1 may be coupled by a HISL.

The two chassis units Chassis 0 and Chassis 1 may be coupled via a port connection 608 labeled "PORT: 1/1/0" from Chassis 1 to "PORT: 0/1/0" on Chassis 0. This connection links Node 1 of Chassis 1 to Node 1 of Chassis 0.

In some implementations, the chassis 602 and 604 may be implemented without a backplane. A backplane may typically provide the network device 104 with high-speed interconnections between different modules or chassis.

In some implementations, a port-to-port connection 608 (labeled as "PORT: 1/1/0" to "PORT: 0/1/0") may serve as a substitute for the backplane. As an example, the connection 608 may provide the inter-chassis communication link. In the dual-ASIC configuration, each chassis 602 and 604 may have its own ASIC. To function as a unified switch, these ASICs communicate with each other. The port-to-port connection 608 facilitates this inter-ASIC communication.

In some implementations, the connection 608 may allow the two physically separate chassis 602 and 604 to operate as a single logical switch by providing the exchange of control and data traffic between the physically separate chassis 602 and 604. The connection 608 allows means for the transfer of network traffic between the two chassis 602 and 604. For instance, if a packet is forwarded from a port on chassis 602 to a port on chassis 604, the packet may traverse the connection 608.

The connection 608 may allow synchronizing control plane information between the two chassis 602 and 604, allowing them to operate relatively in unison as a single virtual switch.

Using a port-to-port connection 608 instead of a traditional backplane may provide greater flexibility in terms of physical arrangement and potential for scaling the network device 104 by adding more chassis in the future.

This approach allows for creation of a high-capacity switch using smaller, potentially more cost-effective ASICs, without the need for a more complex and expensive custom backplane design.

FIG. 6 demonstrates how the network device 104 handles multicast traffic, which involves sending packets from one source to multiple destinations relatively simultaneously. A VSF table 610 is illustrated to indicate which output port may be used for transmitting data from a source chassis to a destination chassis. the table 610 may have four rows of data. In some implementations, the table 610 headers may be "SRC_CHASSIS" for the source chassis, "DST_CHASSIS" for the destination chassis, and "OUT_PORT" for the output port. The table 610 may show different combinations of source and destination chassis numbers (0, 1, 2, 3) with the output port of 1/0/0.

As an example, the first entry may instruct to route data packets from the source chassis 0 to the destination chassis 2 using the output port 1/0/0. In some implementations, the second entry may instruct to route the data packets from the source chassis 0 to the destination chassis 3 using the output port 1/0/0. In some implementations, the third entry may instruct to route the data packets from the source chassis 1 to the destination chassis 2 using the output port 1/0/0. In some implementations, the fourth entry may instruct to route the data packets from the source chassis 1 to the destination chassis 3 using the output port 1/0/0.

This configuration may allow multicast traffic to be appropriately routed substantially regardless of which physical switch 602 or 604 (that may include, e.g., an ASIC) may be the source or destination.

In some implementations, the network device 104 may use different output ports for different chassis. For instance, chassis 0 may use a real physical port (e.g., 1/0/0) for routing, while chassis 1 may use the HISL for routing to the same destinations (e.g., to the Node 1 of the Chassis 1).

This configuration illustrates how the network device 104 may internally manage multiple physical switches (which can include ASICs) while presenting itself as a single virtual switch. The HISL, which may correspond to the communication link 112, may facilitate internal communication between nodes within each chassis 602 and 604. The port connection 608 between chassis 0 and 1 may allow for inter-chassis communication, allowing the system to function as a unified entity.

The configuration call notation and the accompanying table may represent how the network device 104 configures the VSF table 610 for traffic routing. This table 610 may determine how traffic may be directed between different chassis, e.g. chassis 602 and 604, and nodes (e.g., respective nodes 0 and 1 for each chassis 602 and 604) within the network device 104. By using a single output port (1/0/0) for various source and destination combinations, the network device 104 may simplify its routing logic while maintaining the flexibility to handle different traffic scenarios.

For multicast configurations, the VSF tables may be more complex in comparison to the tables illustrated in FIG. 5 for the unicast configurations. It may be appropriate for the network device 104 to configure multiple entries to provide appropriate routing of multicast traffic across all relevant switches and ports. In some implementations, a single multicast routing instruction may result in four entries in the VSF table 608.

In multicast traffic handling, when a packet arrives, the network device 104 may look at its multicast group address. In some implementations, the network device 104 then consults the VSF table 610 to determine multiple output ports. The packet may be replicated and sent out on all relevant output ports. This process allows for efficient distribution of the same data to multiple nodes, reducing overall network load compared to sending individual unicast packets to each node.

For example, if Chassis 0 sends a packet to both Chassis 2 and Chassis 3, the network device 104 may consult table 610 and forward copies of the packet to both destinations, for example, using different output ports. This multicast approach may be particularly suited for applications like video streaming or real-time or near real-time data distribution to multiple clients.

The multicast VSF table 610 may be more complex than the unicast tables seen in FIG. 5, because the VSF table 610 may be configured to handle one-to-many transmissions. In some implementations, the VSF table 610 accounts for multiple possible destinations for each source, which increases the complexity of the routing process but allows for more efficient network utilization when the same data is sent to multiple destinations. This multicast configuration provides benefits in scenarios where data needs to be distributed to multiple recipients simultaneously, such as in large-scale content delivery or collaborative applications.

In some implementations, the use of the HISL and the VSF table 610 allows the dual-ASIC switch to function as a single logical entity from the perspective of external devices and management systems, despite the underlying complexity of handling multicast traffic across multiple physical components of the network device 104. This approach maintains the perception of a single unified switch while providing the capabilities for efficient multicast routing.

Figure 7:
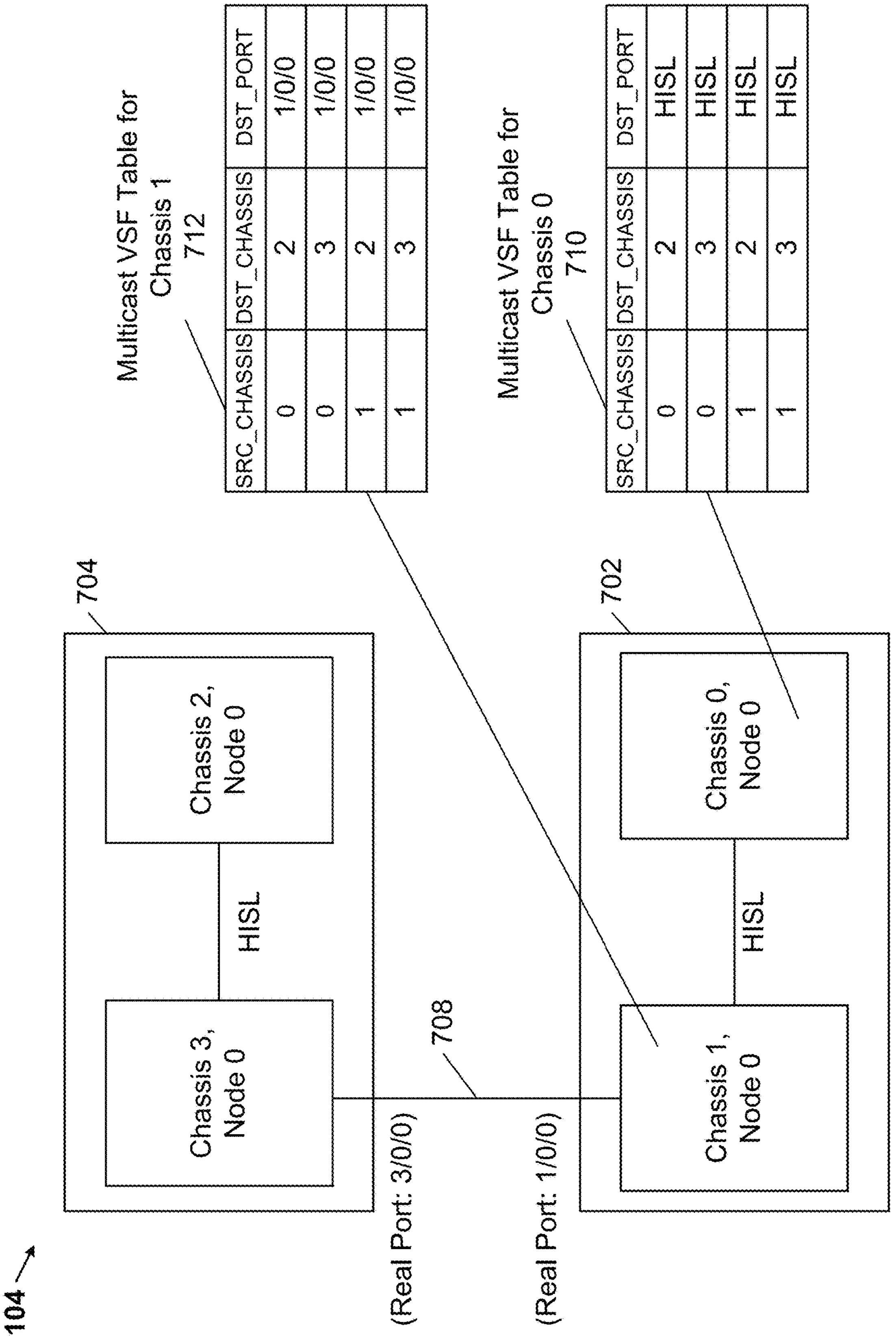
FIG. 7 illustrates an example system diagram of a network device with multicast VSF tables, according to some implementations.

Referring to FIG. 7, the figure illustrates a block diagram of a network device 104 with multicast VSF tables 710 and 712. The network device 104 includes two pairs 702 and 704 of chassis.

In some implementations, a first pair 702 of chassis includes Chassis 1, Node 0 and Chassis 0, Node 0. In some implementations, a second pair 704 of chassis consists of Chassis 3, Node 0 and Chassis 2, Node 0. The respective nodes of each pair 702 and 704 may be coupled internally by a hidden link (e.g., the communication link 112), implemented as a HISL.

In some implementations, the network device 104 may have an inter-switch link 708 having two actual ports: a first port labeled "REAL PORT: 1/0/0" coupled to the chassis pair 702 and a second port labeled "REAL PORT: 3/0/0" coupled to the chassis pair 704.

Two tables 710 and 712 may be illustrated, labeled "MULTICAST VSF TABLE FOR CHASSIS 1" and "MULTICAST VSF TABLE FOR CHASSIS 0," respectively. The tables 710 and 712 may include information about source chassis SRC_CHASSIS, destination chassis DST_CHASSIS, and destination port DST_PORT for multicast traffic routing.

The network device 104 may use the multicast VSF tables 710 and 712 to manage the routing of multicast traffic across the multiple chassis. In some implementations, the multicast VSF tables 710 and 712 may provide a mapping between source chassis SRC_CHASSIS, destination chassis DST_CHASSIS, and the corresponding output ports DST_PORT for multicast traffic. This mapping may be used to direct multicast traffic from a source chassis to one or more destination chassis via the specified output ports.

In some implementations, the network device 104 may dynamically adjust the configuration of the multicast VSF tables based on real-time or near real-time network conditions. This dynamic adjustment may improve performance and resource utilization, potentially improving the efficiency of network operations.

In some aspects, the network device 104 may use the communication link 112 for internal communication within each chassis pair, while using physical ports (such as REAL PORT: 1/0/0 and REAL PORT: 3/0/0) for communication between pairs 702 and 704.

In some implementations, the network device 104 uses the multicast VSF tables 710 and 712 to manage the routing of multicast traffic across the multiple chassis efficiently. When multicast traffic is received, the network device 104 may consult these tables to determine the appropriate output ports for forwarding the traffic to multiple destinations simultaneously.

In some implementations, the use of two separate multicast VSF tables (710 for Chassis 0 and 712 for Chassis 1) allows for distributed decision-making in routing multicast traffic. Each chassis 0 and 1 can make routing decisions based on its local VSF table 712 and 710, respectively, which helps in scaling the system and reducing the load on any single routing table.

For example, if multicast traffic originates from Chassis 0 and needs to be sent to both Chassis 2 and Chassis 3, the network device 104 may consult table 712. The table 712 may indicate that it may be appropriate to send out the traffic through the REAL PORT: 1/0/0, which connects to the chassis pair 704. The HISL within the chassis pair 704 may then be used to distribute the traffic to both Chassis 2 and Chassis 3.

Figure 8:
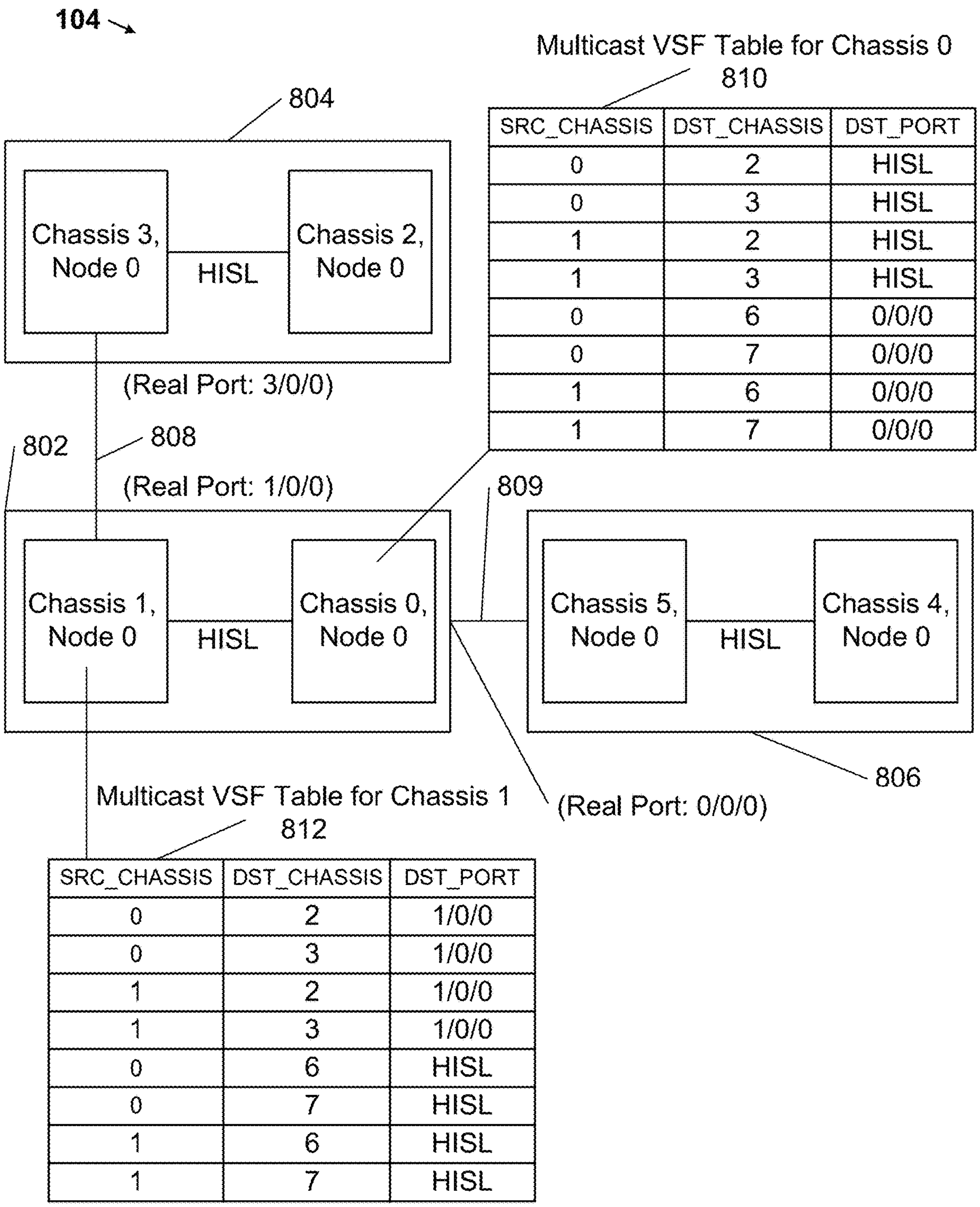
FIG. 8 illustrates an example network device with multiple chassis and multicast VSF tables, according to some implementations.

Referring to FIG. 8, an expanded network device 104 with multiple chassis and nodes is illustrated, according to some embodiments. The network device 104 may include multiple pairs 802, 804, and 806 of chassis. Each pair 802, 804, and 806 of chassis in the network device 104 may include two nodes, labeled as Node 0 and Node 1. Within each pair 802, 804, and 806 of chassis, Node 0 and Node 1 may be interconnected by the HISL, facilitating internal communication between the nodes within the same pair of chassis.

As an example, the pair 802 of chassis may be coupled to two other pairs 804 and 806. The pairs 802, 804, and 806 of chassis may be interconnected via port connections 808 and 809 (which may have ports 3/0/0, 1/0/0, and 0/0/0), allowing for communication between different pairs 802, 804, and 806 of chassis. In some implementations, the network device 104 may have an inter-switch link 708 having two actual ports: a first port labeled "REAL PORT: 1/0/0" coupled to the chassis pair 702 and a second port labeled "REAL PORT: 3/0/0" coupled to the chassis pair 704.

This configuration allows for efficient data transfer and coordination between the nodes within each chassis pair 802, 804, and 806 and between different pairs 802, 804, and 806 of chassis, potentially improving the performance and reliability of the network device 104.

In some implementations, the table 810 may be associated with the chassis 0 of the pair 802, while table 812 may be associated with chassis 1 of the pair 802. Each table contains multiple entries that map source chassis SRC_CHASSIS to destination chassis DST_CHASSIS and output ports OUT_PORT.

When a multicast packet may be received by any chassis in the network device 104, the network device 104 first identifies the source chassis and the intended destination(s). In some implementations, the network device 104 then consults the appropriate VSF table 810 or 812 based on which chassis received the packet. Based on the destination(s) of the packet, the VSF table 810 or 812 provides information on which output port(s) to use. If it is appropriate to send the packet to multiple destinations, it may be replicated as necessary. The packet(s) may be then forwarded to the specified output port(s).

For example, if a multicast packet may be received by the chassis 0 in the chassis pair 802, then the network device 104 consults table 810. If the destination includes chassis in pairs 804 and 806, the table may indicate that the packet will be sent out through port 1/0/0 (to reach pair 804) and port 0/0/0 (to reach pair 806). In some implementations, the packet may be replicated and sent out through both these ports.

In some implementations, each chassis pair 804 and 806 may include its own set of VSF tables, similar to those VSF tables 810 and 812 shown for the chassis pair 802. When the packet reaches pairs 804 and 806, their respective VSF tables (like the above described tables 810 and 812) may be consulted to determine if further forwarding may be necessary. The communication links 112 (e.g., HISL) between chassis in each pair may allow for efficient communication between chassis in the same pair without using the external ports. The VSF tables allow the network device 104 to maintain efficient routing and the perception of a single unified switch across this more complex multi-chassis setup.

As the network device 104 scales to support more than two switches, the VSF tables may be expanded accordingly. For each additional switch added to the topology, new entries may be appropriate in the VSF tables of all existing switches to maintain proper routing paths. This expansion of VSF tables allows the network device 104 to manage traffic routing across a larger number of physical switches while still presenting a unified interface to external management systems and users.

In some implementations, the network device 104 may employ routing algorithms that determine the most efficient path for data transmission. For instance, if data is sent from a node in chassis pair 804 to a node in chassis pair 806, the system may route the data through chassis pair 802.

When additional chassis pairs are added to the topology or potentially form more complex topologies. In some implementations, the network device 104 can dynamically update its VSF tables and routing algorithms to accommodate the expanded network. Such configuration allows the network device 104 to achieve scalability and ability to handle larger network topologies while maintaining the external perception of a single unified switch.

In some implementations, the network device 104 may improve scalability and flexibility by allowing network administrators to add or remove physical switches while maintaining the appearance of a single logical entity. This capability may facilitate easier network expansion or reconfiguration substantially without disrupting the overall network topology.

Figure 9A:
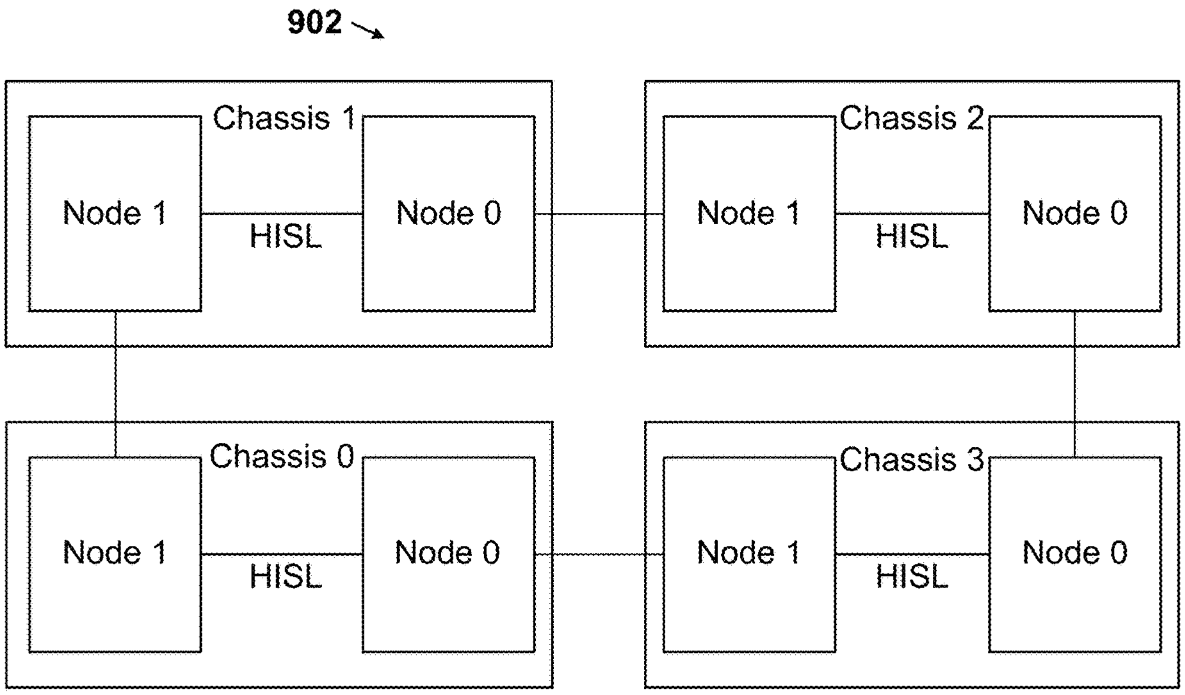
FIG. 9A illustrates an example customer view of a network device with multiple chassis and nodes, according to some implementations.

Referring to FIG. 9A, the figure illustrates a customer view 902 of the network device 104. The diagram depicts four chassis: Chassis 0, Chassis 1, Chassis 2, and Chassis 3, each chassis containing two nodes. These chassis units may be arranged in a ring topology, with each chassis coupled to two other chassis. Within each chassis, Node 0 and Node 1 may be coupled by a Hidden Internal Stack Link (HISL), represented by a line labeled "HISL" between the nodes.

Figure 9B:
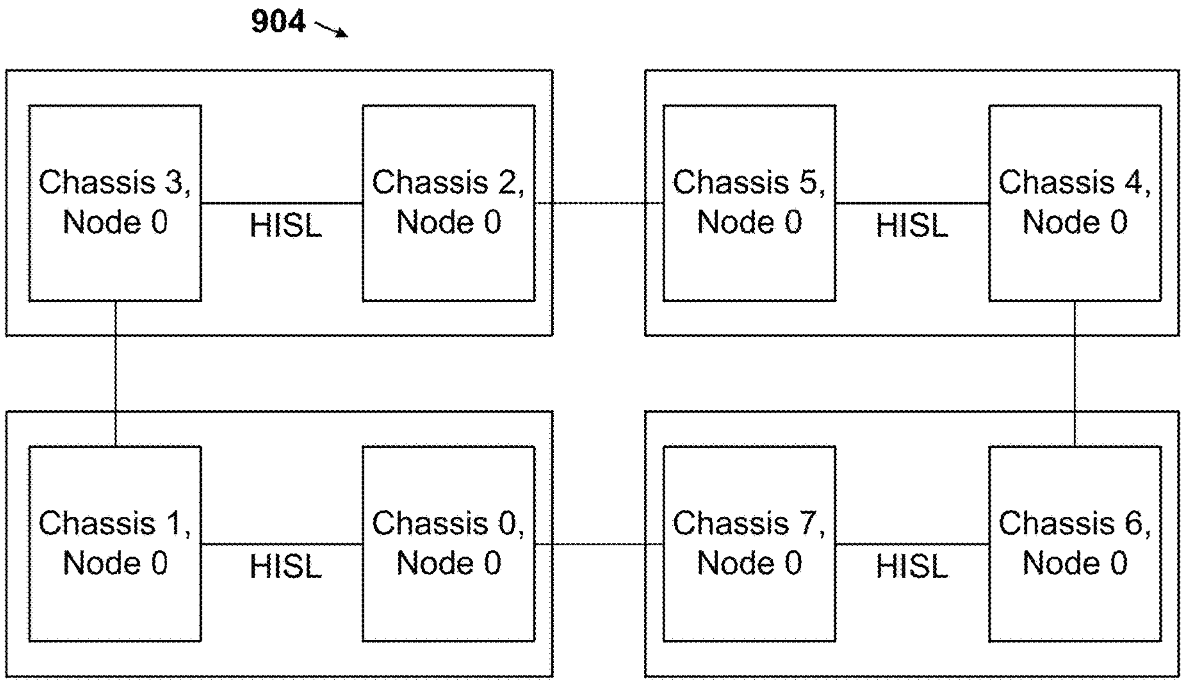
FIG. 9B illustrates an example of an actual implementation of a network device with multiple chassis and nodes illustrated in FIG. 9A, according to some implementations.

Referring to FIG. 9B, the figure illustrates the actual implementation 904 of the network device 104. The system comprises eight chassis, e.g., Chassis 0 through Chassis 7, each chassis containing a single node (Node 0). These chassis may be arranged in four pairs, with each pair coupled internally by a communication link 112, implemented as a HISL.

In some implementations, the network device 104 includes eight chassis, each containing a single node (Node 0). These chassis (Chassis 0 through Chassis 7) may be arranged in four pairs, with each pair coupled internally by a communication link 112, implemented as the HISL. The HISL couplings may be shown between each pair of chassis: between chassis 0 node 0 and chassis 1 node 0, chassis 2 node 0 and chassis 3 node 0, chassis 4 node 0 and chassis 5 node 0, and chassis 6 node 0 and chassis 7 node 0.

In some implementations, chassis 0 node 0 couples to chassis 2 node 0, which links to chassis 4 node 0. Chassis 4 node 0 couples to chassis 6 node 0, which in turn links back to chassis 0 node 0, forming a ring topology. Similarly, chassis 1 node 0 couples to chassis 3 node 0, which links to chassis 5 node 0. Chassis 5 node 0 then couples to chassis 7 node 0, which completes the ring by linking back to chassis 1 node 0.

This comparison between the customer view 902 and the actual implementation 904 illustrates how the network device 104 may present a simplified topology to the user while internally managing a more complex structure. From the customer perspective, the network device 104 appears as four interconnected chassis of a single virtual switch, each chassis with two nodes. However, the actual implementation involves eight single-node chassis units, arranged in pairs and interconnected in a more complex manner. In some implementations, each pair of chassis (having a first chassis and a second chassis) may include the first physical switch 108 (corresponding to the first chassis) and the second physical switch 110 (corresponding to the second chassis) of each pair of chassis illustrated in FIG. 8.

The use of the communication link 112 (e.g., HISL) allows the system to present this simplified view while maintaining the flexibility and performance benefits of the more complex internal structure. This approach may simplify network management for the customer, potentially reducing configuration complexity and the risk of errors, while still allowing the network device 104 to provide the advantages of a distributed, multi-switch architecture.

As an example, when a sudden surge in network traffic may be detected, the network device 104 may employ various strategies to automatically reallocate resources. In some implementations, network device 104 may redistribute traffic across multiple ports or ASICs to prevent any single component from becoming overwhelmed. Such redistribution may involve adjusting the VSF tables to route traffic through less congested paths.

In some implementations, the network device 104 may dynamically increase the speed of certain ports to accommodate higher traffic volumes. Such port speed adjustment may include reconfiguring the port settings on the first network switch 108 or the second network switch 110.

In some implementations, network device 104 may perform QoS adjustments. As an example, the network device 104 may reprioritize traffic based on predefined policies, ensuring important applications receive necessary bandwidth during traffic surges.

In some implementations, the network device 104 may adjust VLAN configurations to improve traffic flow and reduce congestion in specific network segments. In some implementations, the system may activate dormant ports or ASICs to provide additional capacity during peak traffic periods.

In some implementations, the network device 104 may implement or adjust traffic shaping policies to manage bandwidth allocation more effectively during traffic surges. In some implementations, the network device 104 may dynamically update routing tables to find more efficient paths for traffic flow, potentially utilizing the communication link 112 more heavily for inter-switch communication.

In some implementations, the network device 104 may dynamically adjust buffer allocations across different ports or queues to prevent packet loss during traffic spikes. In some implementations, the network device 104 may increase power allocation to certain components to improve their performance during high-traffic periods.

In some implementations, the network device 104 may leverage real time or near real time analytics to predict traffic patterns and proactively adjust configurations before congestion occurs. The dynamic reconfiguration capability described herein may be beneficial in environments with fluctuating network loads, such as cloud computing platforms or large enterprise networks with variable traffic patterns. By automatically adapting to changing network conditions, the network device 104 may improve performance and efficiency without requiring frequent manual oversight or intervention.

The ability to dynamically adjust configurations may also improve resilience of the network device 104 to unexpected network events or failures. For instance, if one component of the network device 104 experiences issues, the network device 104 may automatically reroute traffic through other available paths, potentially reducing service disruptions.

In some implementations, this capability may allow the network device 104 to operate more efficiently under normal conditions by improving resource allocation based on current network demands. This may lead to improved overall network performance and potentially reduce operational costs by maximizing the utilization of existing hardware resources.

In some implementations, the dynamic nature of the network device 104 improves performance and reduces the risk of configuration errors. By automating these processes, the network device 104 reduces the likelihood of misconfigurations that can lead at least partially to network downtime and/or security vulnerabilities.

Figure 10:
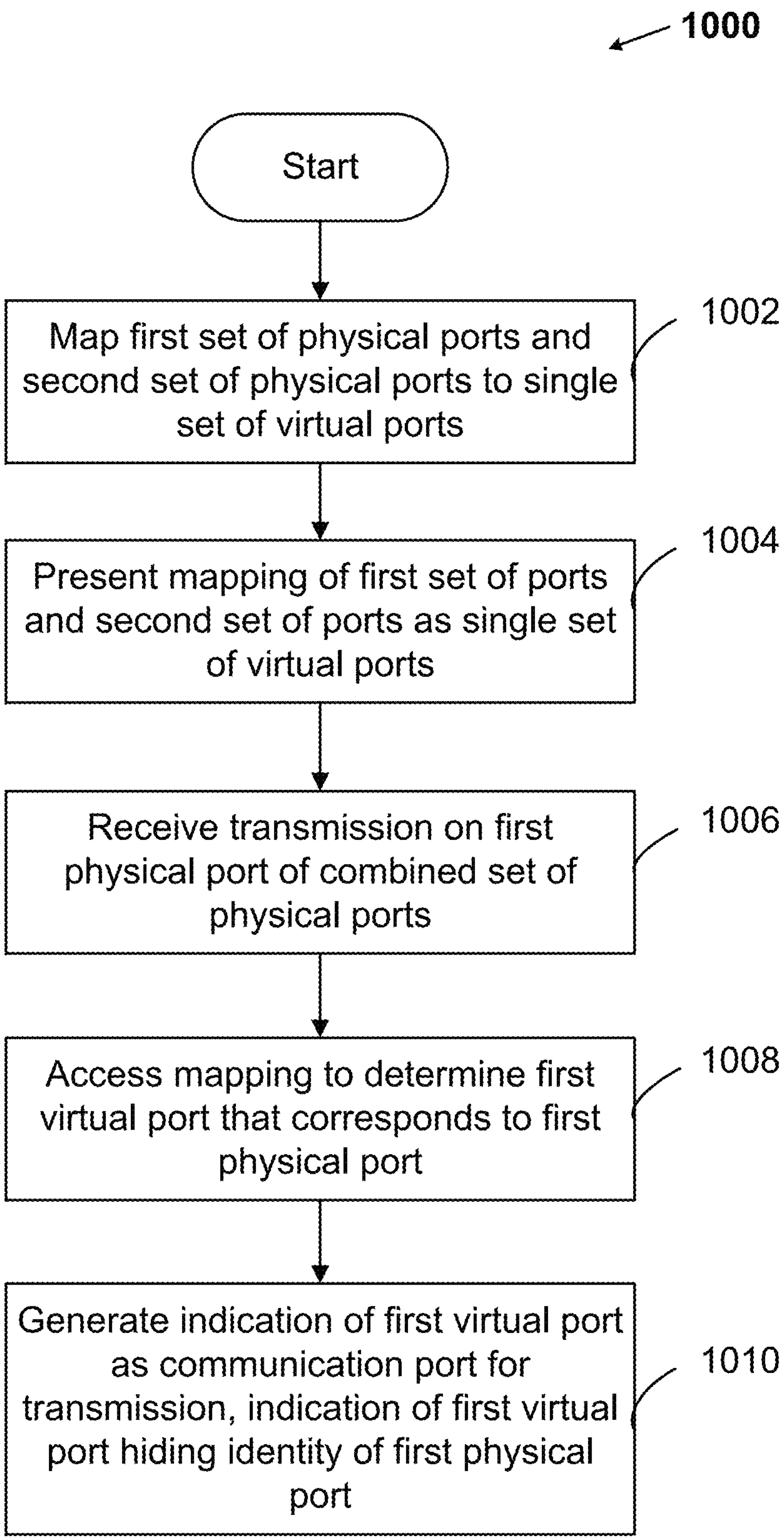
FIG. 10 illustrates a flowchart for a method of network communication in a network device.

FIG. 10 illustrates a flowchart for a method 1000 of network communication in a network device 104. The method 1000 may be implemented by the processor 202 executing instructions stored in the memory 206 of the network device 104. The process begins with step 1002, which includes mapping of a first set of physical ports of the network device 104 and a second set of physical ports of the network device 104 to a single set of virtual ports.

The network device 104 may implement a mapping mechanism that translates between virtual ports presented to the management software and the physical ports on the individual network switches 108 and 110 (which may include, e.g., ASICs). This mapping may be stored in the first storage and may be dynamically updated as the system configuration changes. By maintaining this abstraction layer, the network device 104 may allow existing management tools to interact with the network device 104 using familiar port numbering schemes, even as the underlying hardware configuration becomes more complex.

In some implementations, the processor 202 (FIG. 2) executes instructions stored in the memory 206 to create and maintain the mapping. This mapping may associate each physical port from sets 308 and 310 with a corresponding virtual port in set 114 (FIG. 3). This mapping may correspond to the mapping used in the network device 104 to present the first set 308 of ports of the first network switch 108 and the second set 310 of ports of the second network switch 110 as a single set 114 of virtual ports, as depicted in FIG. 3.

The mapping may be stored in the memory 206, which may act as the first storage. In some implementations, the VSF tables 510 and 512 (FIG. 5) may maintain the relationships between the physical ports on switches 502 and 504 (analogous to 108 and 110 in FIG. 3) and the virtual ports presented to external systems.

The next step 1004 can include presenting the mapping for the first set of ports and the second set of ports as the single set of virtual ports. In some implementations, the API 304 may be configured to correspond with the mapping structure, providing a unified management interface for both network switches 108 and 110. When external systems or management interfaces interact with the network device, such external systems or management interfaces see and interact only with the single set of virtual ports 114.

In some implementations, when the network device 104 presents the first set of physical ports 308 and the second set of physical ports 310 as a single, unified set of virtual ports 114, such abstraction hides the underlying complexity of the dual-switch architecture, allowing the network device 104 to appear and function as a single switch from the perspective of external systems and management interfaces.

The unified interface may simplify network management tasks, potentially reducing the likelihood of configuration errors and streamlining network operations. Network administrators may interact with and manage the system as if it were a single, unified entity, despite the underlying architecture involving multiple hidden chassis and nodes.

The unified management interface may allow network administrators to configure and monitor both the first network switch 108 and the second network switch 110 as a single logical entity. By presenting a unified interface, the system may simplify network management tasks and reduce the potential for configuration errors, while still leveraging the existing ASIC APIs internally.

The next step 1006 includes receiving a transmission on a first physical port of a combined set of physical ports of the network device 104. This first physical port may be part of the sets 308 or 310 of the physical ports, as described in relation to the network device 104 shown in FIG. 3.

The next step 1008 include accessing the mapping to determine a first virtual port of a single set of virtual ports that corresponds to the first physical port. The controller (e.g., processor 202 in FIG. 2) may execute this process of accessing the mapping. In some implementations, step 1008 can include accessing the mapping stored in a first storage to determine the first virtual port. The virtual port may be a part of the set 114 of virtual ports presented by the mapping stored in the first storage.

The virtual port may correspond to the physical port from a first set 308 of physical ports or a second set 310 of physical ports, where the selected port corresponds to the virtual port of the set 114 of virtual ports.

In some implementations, the method 1000 can include step 1010, which may include generating an indication of the first virtual port as a communication port for the transmission, the indication of the first virtual port hiding an identity of the first physical port. The controller (e.g., processor 202 in FIG. 2) may execute the generation process of the indication of the first virtual port hiding an identity of the first physical port. The step 1010 may include providing, by API 304, to a unified management interface for configuring and monitoring both the first network switch 108 and the second network switch 110 as a single logical entity, as shown in FIG. 3.

In some implementations, when a transmission may be received on a physical port (one of the physical ports of sets 308 or 310 of the physical ports), the network device 104 may consult the VSF tables 510 or 512 as shown in FIG. 5. The VSF tables 510 and 512 may contain mappings between the physical ports and the virtual ports. Instead of indicating the actual physical port (e.g., a port on switch 502 or 504) where the transmission was received, the network device 104 generates an indication of a corresponding virtual port from the set of virtual ports 114.

This virtual port indication may be used as the communication port for the transmission in all subsequent processing and external communications. In some implementations, the communication may be sent through the communication link 112 if the physical port corresponding to the virtual port may be on a different network switch than the physical port that received the communication, as shown in the interconnected chassis configuration in FIGS. 4 and 5.

By using this virtual port indication, the network device 104 effectively hides the identity of the actual physical port where the transmission was received. External systems and management interfaces interact with these virtual ports, unaware of the underlying physical port structure split across multiple physical switches (e.g., the switches 108 and 110).

The method 1000 can include dynamically adjusting the configuration of internal VSF members in the network device 104. The method 1000 may include monitoring real-time or near real-time network conditions. This monitoring process may involve collecting data on various network parameters such as traffic load, latency, and resource utilization across the network device 104. Based on the monitored network conditions, the method 1000 may proceed to improve performance or resource utilization by adjusting the configuration of VSF members. This dynamic adjustment may involve reallocating resources, modifying routing paths, or reconfiguring virtual ports to improve network performance and efficiency.

The method 1000 can include arranging network switches in the network device 104. The method 1000 may include configuring the first network switch 108 and the second network switch 110 in at least one of a star topology, a ring topology, or a mesh topology. This flexibility in network topology may allow network administrators to design network layouts that suit their specific requirements. For example, a star topology may be preferred in a centralized network architecture, while a mesh topology may provide improved redundancy and fault tolerance in a distributed environment.

The method 1000 can include managing routing of network traffic in the network device 104. In some implementations, the method 1000 utilizes SDN protocols to manage routing of network traffic between the first network switch 108 and the second network switch 110. The SDN protocols may allow more flexible and efficient control of network resources, aligning with the system's goal of presenting a unified, single virtual switch to the user while managing the complexity of multiple physical switches behind the scenes. This approach may allow for more granular control and automation of network functions while maintaining the abstraction of a single virtual switch.

The method 1000 can include updating a mapping in the network device 104. The method 1000 can include receiving a configuration request to modify the mapping. Such request may come from a network administrator or an automated system requesting the adjustment of the network configuration. In some implementations, following the receipt of the request, the method 1000 proceeds to update the mapping according to the received configuration request. The method 1000 may include modifying the associations between virtual ports and physical ports, potentially allowing for dynamic reconfiguration of the network topology and/or the addition of new network switches to the network device 104.

The method 1000 can include managing storage in the network device 104. In some implementations, the method 1000 include utilizing the same storage for the first storage and the second storage. This approach may simplify the storage architecture of the network device 104, potentially reducing system complexity and improving efficiency. By using a single storage unit for both the first and second storage, the system may facilitate faster data access and retrieval, potentially improving the overall performance of the network device 104.

The method 1000 provides a relatively straightforward process for routing network communications through virtual ports to physical ports in the network device 104. The method 1000 utilizes the stored mapping to translate between virtual and physical ports, allowing for flexible network configurations such as those shown in the customer view 902 and actual implementation 904 in FIGS. 9A and 9B, respectively. This approach supports the system ability to present multiple physical switches as a single virtual switch to external devices, potentially reducing complexity and streamlining network administration tasks.

The method 1000 can provide the flexibility, scalability, and efficiency of the network device 104. The method 1000 can dynamically adapt to changing network conditions, support various network topologies, leverage advanced networking protocols, provide unified management interfaces, accommodate configuration changes, and optimize storage utilization. The capabilities of the method 1000 may contribute to a more robust, efficient, and manageable network infrastructure, potentially addressing various challenges in modern network environments.

The network device 104 may integrate with existing software and maintain compatibility with current ASIC APIs in several ways. In some implementations, the network device 104 may utilize the same ASIC API calls that may be used in previous switch designs. This approach may allow the network device 104 to maintain compatibility with existing software stacks, potentially reducing the need for extensive code modifications. By preserving the familiar API structure, the network device 104 may allow developers to use their existing knowledge and codebase when working with the new dual-ASIC configuration.

The network device 104 may implement a translation layer within the API that converts high-level commands intended for a single virtual switch into appropriate instructions for each physical ASIC. This translation process may occur relatively transparently, allowing higher-level software to interact with the network device 104 as with a single, unified switch. For example, when a command may be issued to configure a port on the virtual switch, the API may interpret this command and generate the appropriate instructions for the specific physical switch where that port actually resides.

In some implementations, the network device 104 may maintain the existing VSF code used in previous switches. This reuse of VSF code may allow the system to leverage proven functionality while adapting it to work with the new dual-ASIC architecture. The network device 104 may handle the complexity of managing multiple ASICs internally, presenting a consistent VSF interface to higher-level software.

In some implementations, the network device 104 may provide backward compatibility modes that allow it to emulate the behavior of previous single-ASIC switch models. This capability may allow the system to be deployed in existing network environments with minimal disruption, potentially allowing for gradual migration and integration of the new dual-ASIC architecture.

By maintaining compatibility with current ASIC APIs and integrating relatively seamlessly with existing software, the network device 104 may provide a path for network infrastructure upgrades that reduces disruption to existing operations and utilizes existing investments in software and training. This approach may contribute to reduced development effort and faster time-to-market for new switch models based on the dual-ASIC architecture.

The network device 104 may provide several advantages in terms of cost-effectiveness and reduced development effort. In some implementations, the network device 104 may allow for the use of smaller, less expensive ASICs while maintaining the functionality of larger switches. This approach may allow the creation of cost-effective, high-performance switches for enterprise and data center environments. By utilizing the hidden virtual switch framework, the network device 104 may create switches with higher port densities using smaller, more affordable ASICs, potentially reducing manufacturing costs while maintaining or improving performance.

The architecture of the network device 104 may allow for the creation of different switch models (e.g., 24-port, 48-port) using the same base components. This flexibility in product design may allow the production of a range of switches that provide the functionality and port density of higher-end models at more competitive price points. For example, the network device 104 may produce 48-port switches using two 24-port ASICs that perform comparably to traditional 48-port ASIC designs, but potentially at a lower cost.

In some implementations, the network device 104 may reduce changes needed to existing software by maintaining current ASIC APIs. This compatibility may reduce development effort and time, as it may allow for the reuse of existing code and reduce the need for extensive software modifications. As an example, the network device 104 may present itself as a single virtual switch 114 to users and management software, potentially simplifying the integration process with existing network management tools and reducing the learning curve for network administrators.

The hidden virtual switch framework may allow for efficient communication between ASICs through the HISL. This high-bandwidth, relatively lossless communication channel may allow the system to function as a single, more powerful switch while simplifying network management. The efficient inter-ASIC communication may contribute to improved overall performance of the network device 104 without requiring significant additional development effort.

In some implementations, the network device 104 may improve fault tolerance. The dual-ASIC configuration may potentially provide redundancy and failover capabilities, improving reliability of the network device 104 without requiring the development of entirely new fault tolerance mechanisms.

The ability of the network device 104 to present a simplified topology to users while managing a more complex internal structure may reduce may reduce the need for extensive user training and documentation, potentially lowering overall development and support costs.

By supporting various network topologies such as star, ring, mesh, and other suitable network topologies, the network device 104 may improve flexibility in network design. This flexibility may allow network architects to configure network layouts that suit their specific requirements, potentially improving network performance and reliability without requiring the development of multiple specialized systems.

The scalability of the system may provide a flexible solution for growing network demands. As additional switches or ASICs may be added to the system, the HISL may provide a relatively consistent and high-performance method for inter-switch communication, allowing the system to grow without significantly increasing complexity or compromising performance. This scalability may reduce the need for relatively frequent redesigns or the development of new systems to accommodate network growth.

These advantages may contribute to a more cost-effective and efficient network switching solution, potentially reducing both initial implementation costs and ongoing operational expenses while minimizing the development effort required to create and maintain the network device 104.

Although this disclosure describes or illustrates particular operations as occurring in a particular order, this disclosure contemplates the operations occurring in any suitable order. Moreover, this disclosure contemplates any suitable operations being repeated one or more times in any suitable order. Although this disclosure describes or illustrates particular operations as occurring in sequence, this disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. Steps may operate in an operating system environment or as stand-alone routines occupying all or a substantial part of the system processing.

While this disclosure has been described with reference to illustrative implementations, this description is not intended to be construed in a limiting sense. Various modifications and combinations of the illustrative implementations, as well as other implementations of the disclosure, will be apparent to persons skilled in the art upon reference to the description. It is therefore intended that the appended claims encompass any such modifications or implementations.

What is claimed is:

1. A network device comprising:

first switch circuitry associated with a first set of physical ports;

second switch circuitry associated with a second set of physical ports, the first switch circuitry being distinct from the second switch circuitry, the first set of physical ports and the second set of physical ports collectively forming a combined set of physical ports;

a communication link coupling the first switch circuitry and the second switch circuitry;

first storage storing a mapping of the first set of physical ports and the second set of physical ports to a single set of virtual ports, wherein the mapping presents the first switch circuitry and the second switch circuitry as a unified logical switch with each physical port of the combined set of physical ports having a respective virtual port in the single set of virtual ports;

one or more processors;

second storage storing a program comprising instructions that, when executed by the one or more processors, cause the network device to:

receive a transmission on a first physical port of the combined set of physical ports;

access the mapping to determine a first virtual port of the single set of virtual ports that corresponds to the first physical port; and generate an indication of the first virtual port as a communication port for the transmission.

2. The network device of claim 1, wherein the first switch circuitry is implemented in a first application specific integrated circuit (ASIC) and the second switch circuitry is implemented in a second ASIC.

3. The network device of claim 1, wherein the first switch circuitry and the second switch circuitry are housed in distinct physical chassis.

4. The network device of claim 1, wherein the program further comprises instructions to dynamically adjust a configuration of internal virtual switching framework members based on real-time or near real-time network conditions.

5. The network device of claim 4, wherein the dynamic adjustment of the configuration is performed without manual intervention.

6. The network device of claim 1, wherein the first switch circuitry and the second switch circuitry are coupled to a plurality of switch circuitries and arranged in a star topology, a ring topology, or a mesh topology.

7. The network device of claim 1, wherein the program further comprises instructions to manage routing of network traffic between the first switch circuitry and the second switch circuitry using software-defined networking protocols.

8. The network device of claim 1, wherein the program further comprises instructions to configure and monitor the first switch circuitry and the second switch circuitry as a single logical entity.

9. The network device of claim 1, wherein the program further comprises instructions to:

receive a configuration request to modify the mapping; and update the mapping according to the received configuration request.

10. The network device of claim 9, wherein the mapping is updated by:

adding a third switch circuitry to the network device, the third switch circuitry associated with a third set of physical ports; and storing, by the first storage, a mapping of the third set of physical ports to the single set of virtual ports.

11. The network device of claim 1, wherein the first storage and the second storage are implemented in the same memory device.

12. The network device of claim 1, wherein the mapping comprises assigning new identifiers to the first switch circuitry and the second switch circuitry, and wherein the new identifiers are at least partially based on a current identifier assignment of the single set of virtual ports.

13. A method comprising:

generating a mapping of a first set of physical ports of a network device and a second set of physical ports of the network device to a single set of virtual ports, wherein the network device comprises:

first switch circuitry associated with a first set of physical ports;

second switch circuitry associated with a second set of physical ports, the first switch circuitry being distinct from the second switch circuitry; and a communication link coupling the first switch circuitry and the second switch circuitry; and wherein the first set of physical ports and the second set of physical ports collectively form a combined set of physical ports so that, according to the mapping, the first switch circuitry and the second switch circuitry appear to be a single logical entity with each physical port of the combined set of physical ports having a respective virtual port in the single set of virtual ports; and presenting the mapping of the first set of ports and the second set of ports as the single set of virtual ports.

14. The method of claim 13, further comprising:

receiving a transmission on a first physical port of a combined set of physical ports of a network device;

accessing the mapping to determine a first virtual port of a single set of virtual ports that corresponds to the first physical port; and generating an indication of the first virtual port as a communication port for the transmission.

15. The method of claim 13, further comprising:

receiving a configuration request to modify the mapping of physical ports to virtual ports associated with the first switch circuitry and the second switch circuitry;

updating the mapping according to the received configuration request by adding a third switch circuitry to the network device, the third switch circuitry associated with a third set of physical ports; and storing a mapping of the third set of physical ports to the single set of virtual ports.

16. The method of claim 15, further comprising:

assigning new identifiers to the first switch circuitry and the second switch circuitry based on a current identifier assignment of the single set of virtual ports; and configuring and monitoring the first switch circuitry and the second switch circuitry as a single logical entity using programming instructions.

17. The method of claim 13, further comprising:

dynamically adjusting configuration of internal virtual switching framework members based on real-time or near real-time network conditions.

18. A system comprising:

one or more processors;

memory; and a network device comprising:

first switch circuitry associated with a first set of physical ports;

second switch circuitry associated with a second set of physical ports, the first switch circuitry being distinct from the second switch circuitry, wherein the first set of physical ports and the second set of physical ports and collectively forming a combined set of physical ports;

a communication link coupling the first switch circuitry and the second switch circuitry;

mapping storage storing a mapping of the first set of physical ports and the second set of physical ports to a single set of virtual ports such that the mapping presents the first set of ports and the second set of ports as the single set of virtual ports, wherein the mapping presents the first switch circuitry and the second switch circuitry as a unified logical switch with each physical port of the combined set of physical ports having a respective virtual port in the single set of virtual ports;

program storage storing a program that includes instructions that, when executed by the one or more processors, cause the network device to:

receive a transmission on a first physical port of the combined set of physical ports;

access the mapping to determine a first virtual port of the single set of virtual ports that corresponds to the first physical port; and generate an indication of the first virtual port as a communication port for the transmission.

19. The system of claim 18, wherein the program further comprises instructions to configure and monitor the first switch circuitry and the second switch circuitry as a single logical entity.

20. The system of claim 18, wherein the first switch circuitry and the second switch circuitry are housed in distinct physical chassis.

* * * * *